US008837433B2

(12) United States Patent
Amerga et al.

(10) Patent No.: US 8,837,433 B2
(45) Date of Patent: Sep. 16, 2014

(54) PRIORITIZING INTER-FREQUENCY/INTER-RAT MEASUREMENTS AND EMBMS IN LTE

(75) Inventors: Daniel Amerga, San Diego, CA (US); Shailesh Maheshwari, San Diego, CA (US); Muralidharan Murugan, San Diego, CA (US); Ketan N. Patel, San Jose, CA (US); Jack S. Shauh, San Diego, CA (US); Kuo-Chun Lee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 373 days.

(21) Appl. No.: 13/331,044

(22) Filed: Dec. 20, 2011

(65) Prior Publication Data

US 2013/0155881 A1 Jun. 20, 2013

(51) Int. Cl.
*H04W 36/30* (2009.01)

(52) U.S. Cl.
USPC .......................................... 370/332; 455/437

(58) Field of Classification Search
None
See application file for complete search history.

(56) References Cited

U.S. PATENT DOCUMENTS

| | | |
|---|---|---|
| 2008/0287127 A1 | 11/2008 | Wu et al. |
| 2010/0027438 A1 | 2/2010 | Cai |
| 2010/0034126 A1* | 2/2010 | Kitazoe et al. ............... 370/310 |
| 2010/0034158 A1 | 2/2010 | Meylan |
| 2010/0197265 A1* | 8/2010 | Dorenbosch et al. ...... 455/404.1 |
| 2011/0034165 A1 | 2/2011 | Hsu |

FOREIGN PATENT DOCUMENTS

| | | |
|---|---|---|
| EP | 1947779 A1 | 7/2008 |
| GB | 2439888 A | 1/2008 |
| GB | 2474006 A | 4/2011 |
| JP | 2007-104590 A | 4/2007 |
| WO | 2005048529 A1 | 5/2005 |

OTHER PUBLICATIONS

International Search Report and Written Opinion—PCT/US2012/067794—ISA/EPO—Mar. 22, 2013.
Siemens: "Clarification on measurement requirements with MBMS in different UE RLC states", 3GPP Draft; R1-040317, 3rd Generation Partnership Project (3GPP), Mobile Competence Centre; 650, Route Des Lucioles; F-06921 Sophia-Antipolis Cedex; France, RAN WG1, Malaga, Spain; Feb. 13, 2004, XP050098636, [retrieved on Feb. 13, 2004].

* cited by examiner

*Primary Examiner* — Alex Skripnikov
(74) *Attorney, Agent, or Firm* — Arent Fox LLP

(57) ABSTRACT

A method, an apparatus, and a computer program product for wireless communication are provided for prioritizing the performance of measurements during measurement gaps and the reception of multicast/broadcast content. The apparatus receives a configuration from a serving cell to perform a measurement during a measurement gap of a unicast service while in a connected mode. In addition, the apparatus determines whether to refrain from leaving the serving cell on a first frequency and performing the measurement on a second frequency of a neighboring cell in order to receive multicast/broadcast content associated with a multicast/broadcast service during the measurement gap.

40 Claims, 22 Drawing Sheets

PRIORITIZING INTER-FREQUENCY/INTER-RAT MEASUREMENTS AND EMBMS IN LTE

BACKGROUND

1. Field

The present disclosure relates generally to communication systems, and more particularly, to prioritizing inter-frequency and/or inter radio access technology (RAT) measurements and evolved Multimedia Broadcast Multicast Service (eMBMS) in Long Term Evolution (LTE).

2. Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is LTE. LTE is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

A serving evolved Node B (eNB) may command a user equipment (UE) to perform an inter-frequency or inter-RAT measurement while in a connected mode. The eNB may not know when the UE is receiving eMBMS content. As such, there may be a collision between a measurement gap for performing the inter-frequency or inter-RAT measurement and the reception of eMBMS content. As such, a need exists for methods and apparatuses for prioritizing inter-frequency and/or inter-RAT measurements and eMBMS.

SUMMARY

In an aspect of the disclosure, a method, a computer program product, and an apparatus for prioritizing the performance of measurements during measurement gaps and the reception of multicast/broadcast content is provided. The apparatus receives a configuration from a serving cell to perform a measurement during a measurement gap of a unicast service while in a connected mode. In addition, the apparatus determines whether to refrain from leaving the serving cell on a first frequency and performing the measurement on a second frequency of a neighboring cell in order to receive multicast/broadcast content associated with a multicast/broadcast service during the measurement gap.

DETAILED DESCRIPTION

Figure 1:
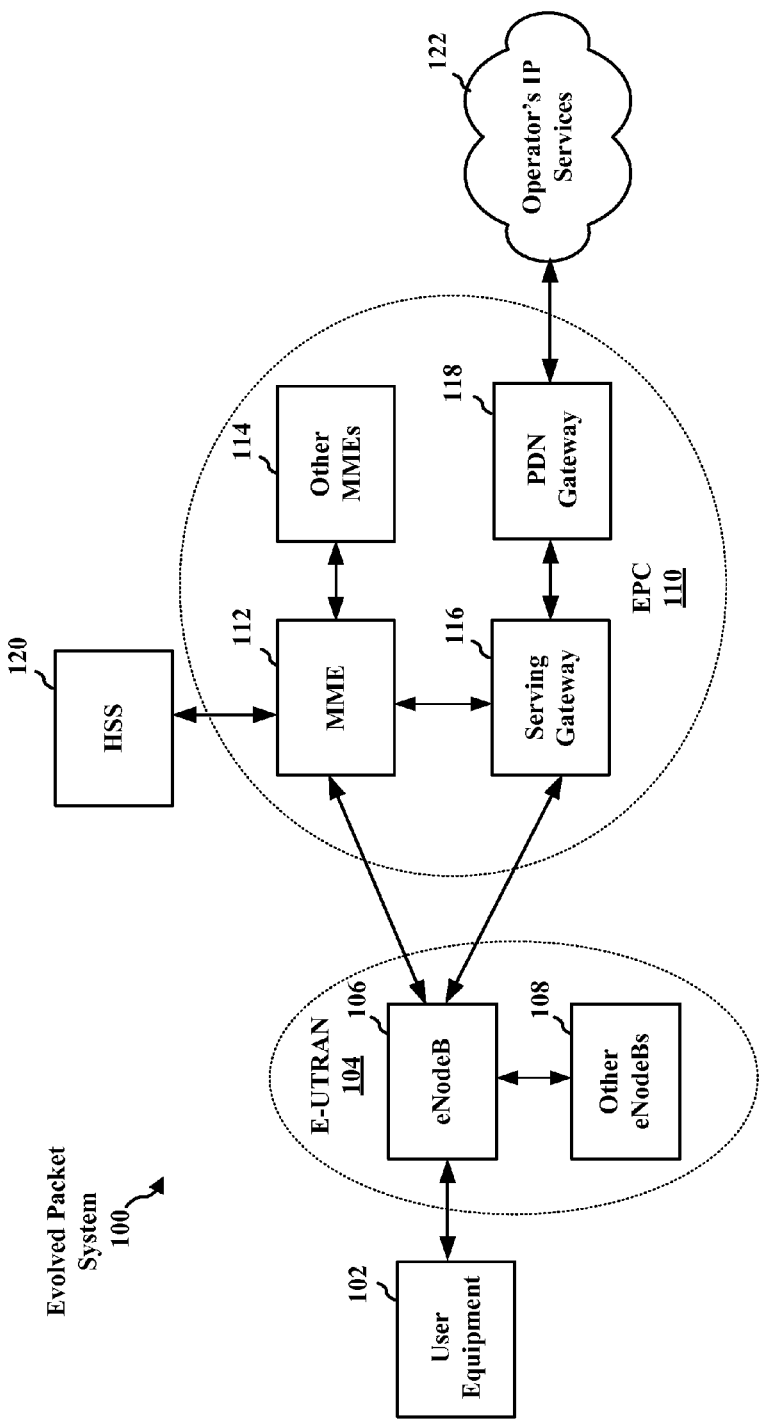
FIG. 1 is a diagram illustrating an example of a network architecture.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

FIG. 1 is a diagram illustrating an LTE network architecture 100. The LTE network architecture 100 may be referred to as an Evolved Packet System (EPS) 100. The EPS 100 may include one or more UE 102, an Evolved UMTS Terrestrial Radio Access Network (E-UTRAN) 104, an Evolved Packet Core (EPC) 110, a Home Subscriber Server (HSS) 120, and an Operator's IP Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the eNB 106 and other eNBs 108. The eNB 106 provides user and control plane protocol terminations toward the UE 102. The eNB 106 may be connected to the other eNBs 108 via an X2 interface (e.g., backhaul). The eNB 106 may also be referred to as a base station, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected by an S1 interface to the EPC 110. The EPC 110 includes a Mobility Management Entity (MME) 112, other MMEs 114, a Serving Gateway 116, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include the Internet, the Intranet, an IP Multimedia Subsystem (IMS), and a PS Streaming Service (PSS).

Figure 2:
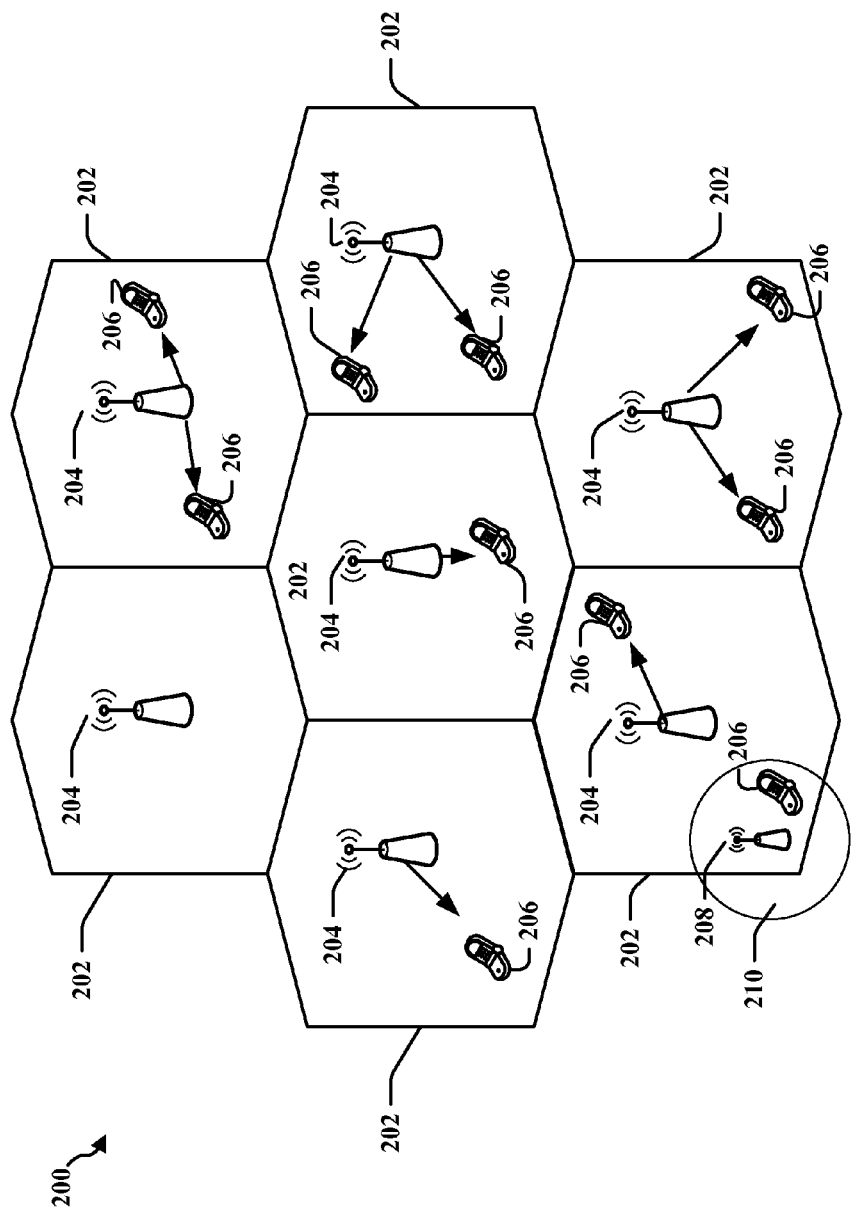
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. A lower power class eNB 208 may be referred to as a remote radio head (RRH). The lower power class eNB 208 may be a femto cell (e.g., home eNB (HeNB)), pico cell, or micro cell. The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116.

The modulation and multiple access scheme employed by the access network 200 may vary depending on the particular telecommunications standard being deployed. In LTE applications, OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data steams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
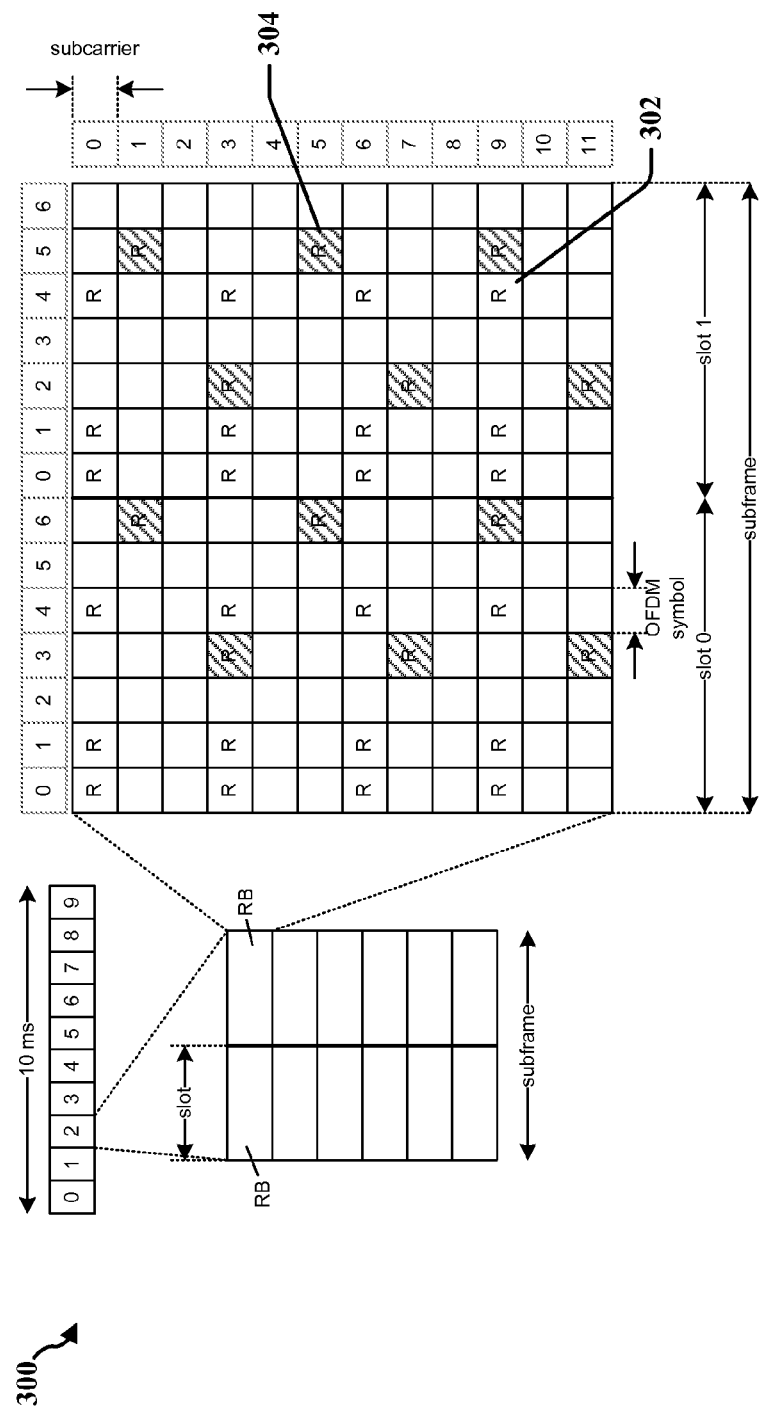
FIG. 3 is a diagram illustrating an example of a DL frame structure in LTE.

FIG. 3 is a diagram 300 illustrating an example of a DL frame structure in LTE. A frame (10 ms) may be divided into 10 equally sized sub-frames. Each sub-frame may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. Some of the resource elements, as indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

Figure 4:
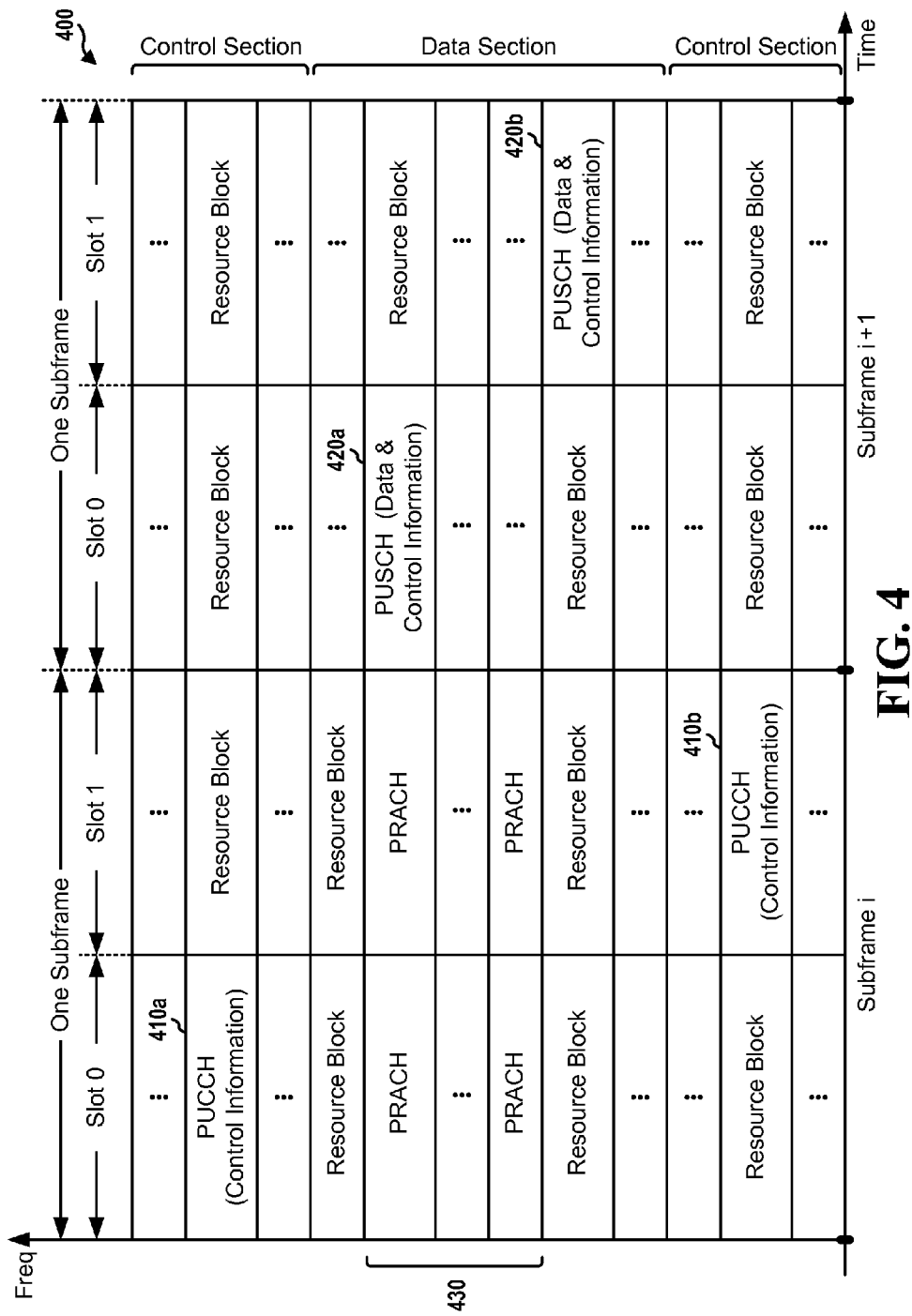
FIG. 4 is a diagram illustrating an example of an UL frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
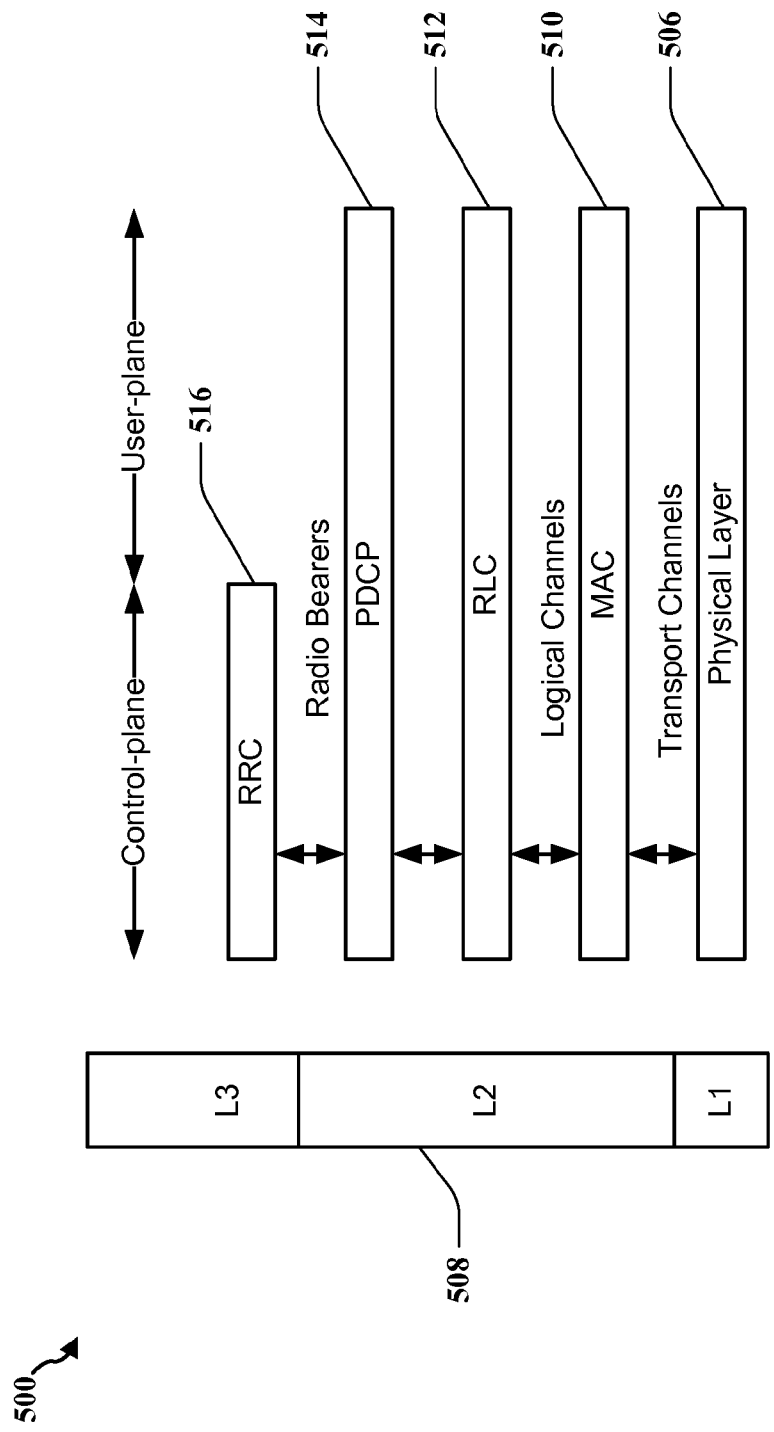
FIG. 5 is a diagram illustrating an example of a radio protocol architecture for the user and control plane.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (i.e., radio bearers) and for configuring the lower layers using RRC signaling between the eNB and the UE.

Figure 6:
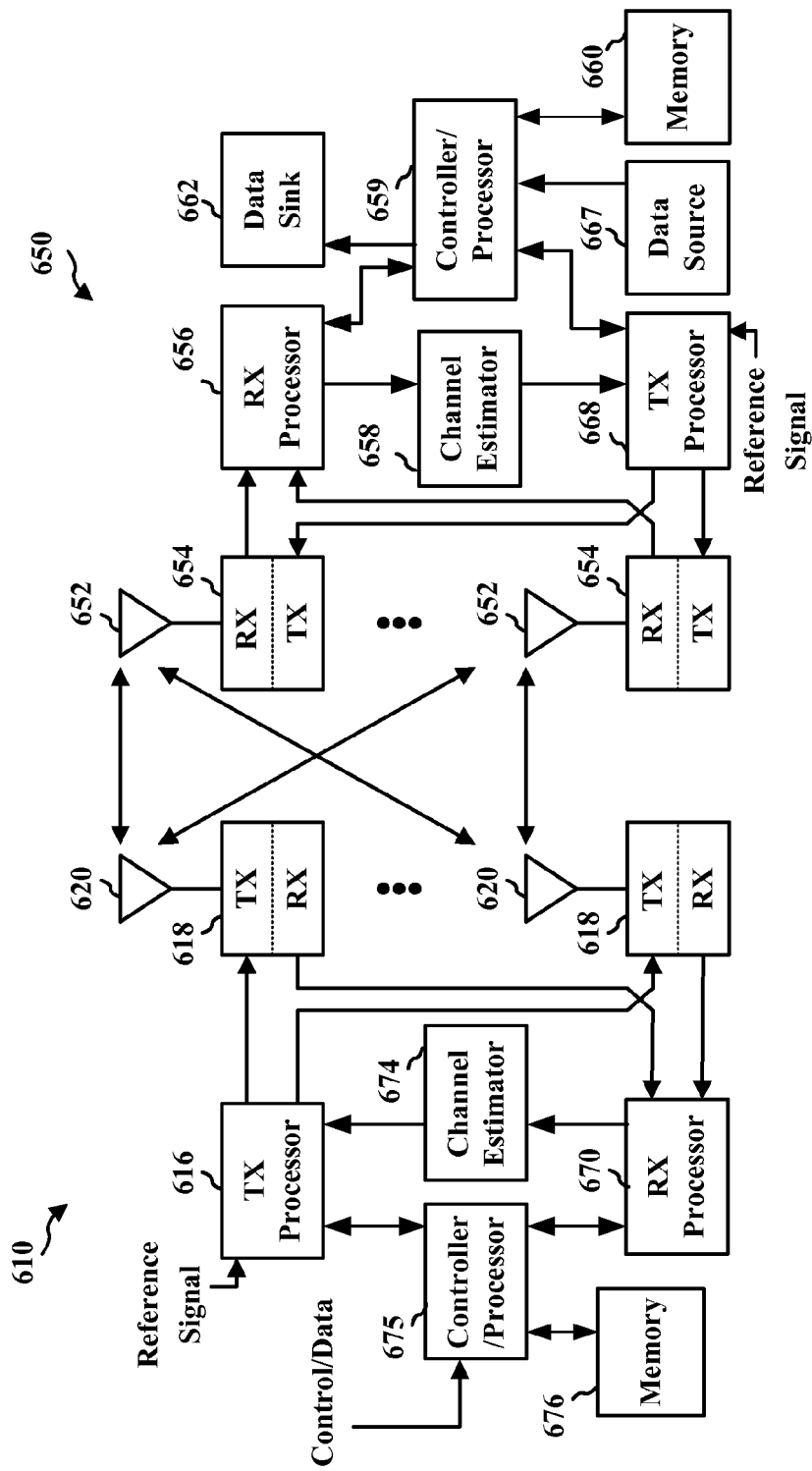
FIG. 6 is a diagram illustrating an example of an eNB and user equipment in an access network.

FIG. 6 is a block diagram of an eNB 610 in communication with a UE 650 in an access network. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The transmit (TX) processor 616 implements various signal processing functions for the L1 layer (i.e., physical layer). The signal processing functions includes coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream is then provided to a different antenna 620 via a separate transmitter 618TX. Each transmitter 618TX modulates an RF carrier with a respective spatial stream for transmission.

At the UE 650, each receiver 654RX receives a signal through its respective antenna 652. Each receiver 654RX recovers information modulated onto an RF carrier and provides the information to the receive (RX) processor 656. The RX processor 656 implements various signal processing functions of the L1 layer. The RX processor 656 performs spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the control/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 are provided to different antenna 652 via separate transmitters 654TX. Each transmitter 654TX modulates an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the control/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

Figure 7:
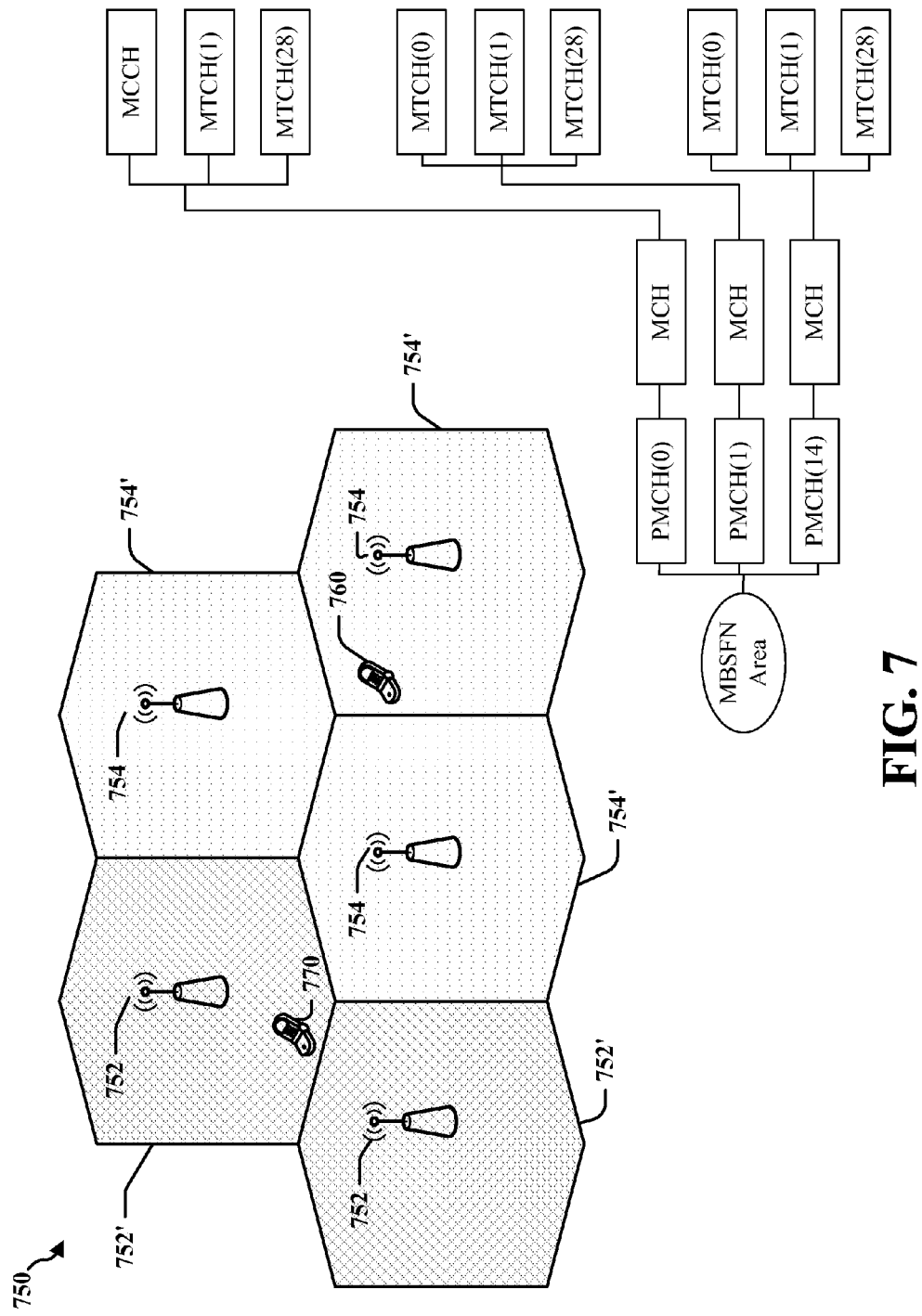
FIG. 7 is a diagram illustrating eMBMS in a Multi-Media Broadcast over a Single Frequency Network.

FIG. 7 is a diagram 750 illustrating evolved Multicast Broadcast Multimedia Service (eMBMS) in a Multi-Media Broadcast over a Single Frequency Network (MBSFN). The eNBs 752 in cells 752' may form a first MBSFN area and the eNBs 754 in cells 754' may form a second MBSFN area. The eNBs 752, 754 may be associated with other MBSFN areas, for example, up to a total of eight MBSFN areas. A cell within an MBSFN area may be designated a reserved cell. Reserved cells do not provide multicast/broadcast content, but are time-synchronized to the cells 752', 754' and have restricted power on MBSFN resources in order to limit interference to the MBSFN areas. Each eNB in an MBSFN area synchronously transmits the same eMBMS control information and data. Each area may support broadcast, multicast, and unicast services. A unicast service is a service intended for a specific user, e.g., a voice call. A multicast service is a service that may be received by a group of users, e.g., a subscription video service. A broadcast service is a service that may be received by all users, e.g., a news broadcast. Referring to FIG. 7, the first MBSFN area may support a first eMBMS broadcast service, such as by providing a particular news broadcast to UE 770. The second MBSFN area may support a second eMBMS broadcast service, such as by providing a different news broadcast to UE 760. Each MBSFN area supports a plurality of physical multicast channels (PMCH) (e.g., 15 PMCHs). Each PMCH corresponds to a multicast channel (MCH). Each MCH can multiplex a plurality (e.g., 29) of multicast logical channels. Each MBSFN area may have one multicast control channel (MCCH). As such, one MCH may multiplex one MCCH and a plurality of multicast traffic channels (MTCHs) and the remaining MCHs may multiplex a plurality of MTCHs.

Figure 8:
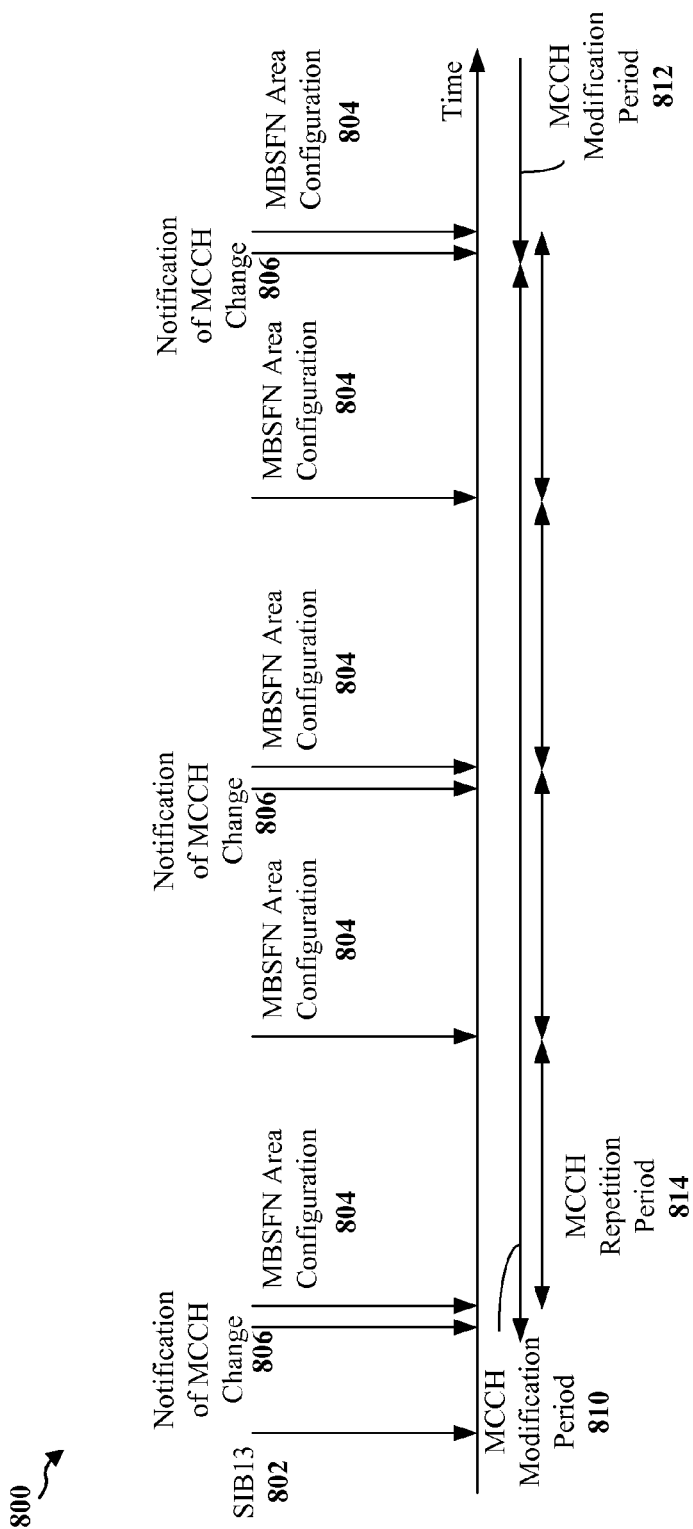
FIG. 8 is a diagram for illustrating the reception of some eMBMS content.

FIG. 8 is a diagram 800 for illustrating the reception of some eMBMS content. The eMBMS content includes control/system information such as a system information block 13 (SIB13), MCCH, MCH scheduling information (MSI), and notification of MCCH change messages; traffic data such as MTCH(s); and other eMBMS related content. As shown in FIG. 8, a UE receives a SIB13 802. The SIB13 indicates the MBSFN area identifier (ID) of each MBSFN supported by the cell, non-MBSFN region length (1 or 2 symbols) per MBSFN area, an MCCH configuration per MBSFN area for receiving the MCCH and the MBSFN area configuration message 804 in the MCCH, and notification information for receiving the notification of MCCH change 806. The MBSFN area configuration message 804 is received each MCCH repetition period 814. The notification of MCCH change 806 and MBSFN area configuration 804 messages received in the MCCH modification period 810 apply in the subsequent MCCH modification period 812. While not shown in FIG. 8, a UE may receive MTCH(s) (i.e., traffic data) along with eMBMS control/system information.

Figure 9:
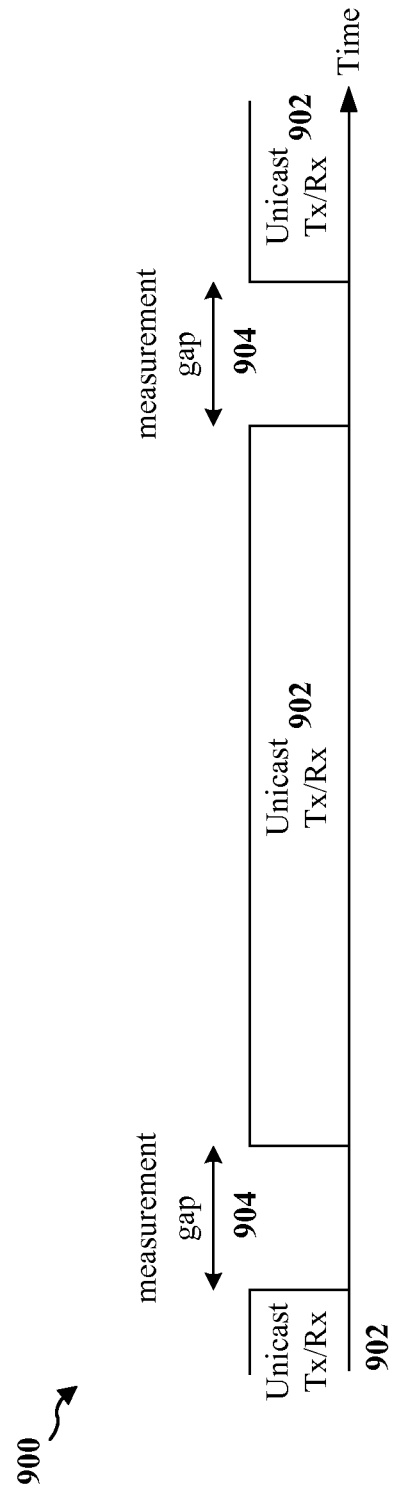
FIG. 9 is a diagram for illustrating a measurement gap.

FIG. 9 is a diagram 900 for illustrating a measurement gap. While a UE is in an RRC connected (RRC_CONNECTED) state, the UE may be commanded by its serving cell to perform an inter-frequency or inter-RAT measurement and report the measurement results. An inter-frequency measurement is a measurement of a different frequency of a different cell in the same RAT. An inter-RAT measurement is a measurement of a different cell in a different RAT. The UE may be commanded to perform the measurement to prepare for an inter-frequency or inter-RAT handover. To avoid interruption of an existing unicast service 902, a measurement gap 904 is provided for the measurement in order to allow the UE to leave from the serving cell on one frequency and perform the measurement on another frequency. The measurement gap 904 is configured in an RRC connection reconfiguration (RRCConnectionReconfiguration) message. The measurement gap may be 6 ms long (i.e., 6 subframes) per 40 ms or 80 ms time period.

Figure 10:
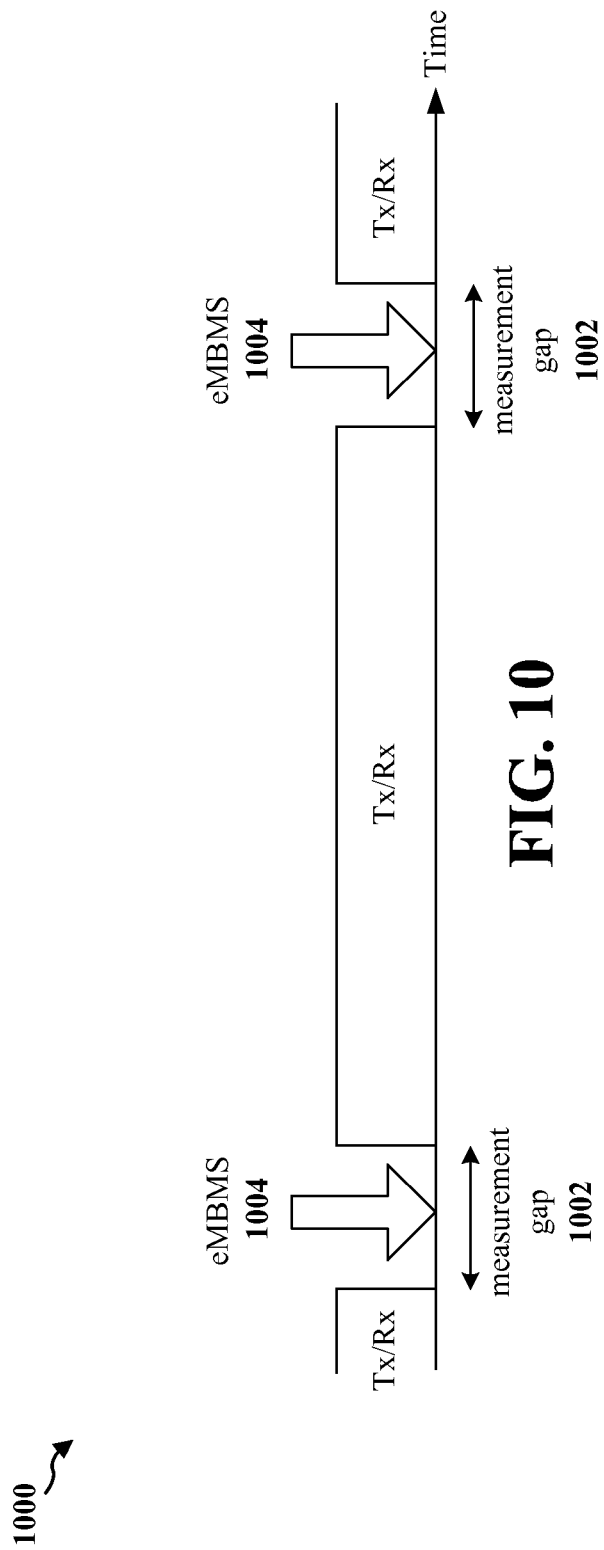
FIG. 10 is a diagram for illustrating an overlap between a measurement gap and eMBMS content.

FIG. 10 is a diagram 1000 for illustrating an overlap between a measurement gap 1002 and eMBMS content 1004. A serving eNB may command a UE to perform an inter-frequency or inter-RAT measurement while in an RRC_CONNECTED state. The eNB may not know when the UE is receiving eMBMS content. As such, there may be a collision between the measurement gap 1002 for performing the inter-frequency or inter-RAT measurement and the reception of eMBMS content 1004. Methods are provided infra for prioritizing inter-frequency/inter-RAT measurements and reception of eMBMS content.

Figure 11:
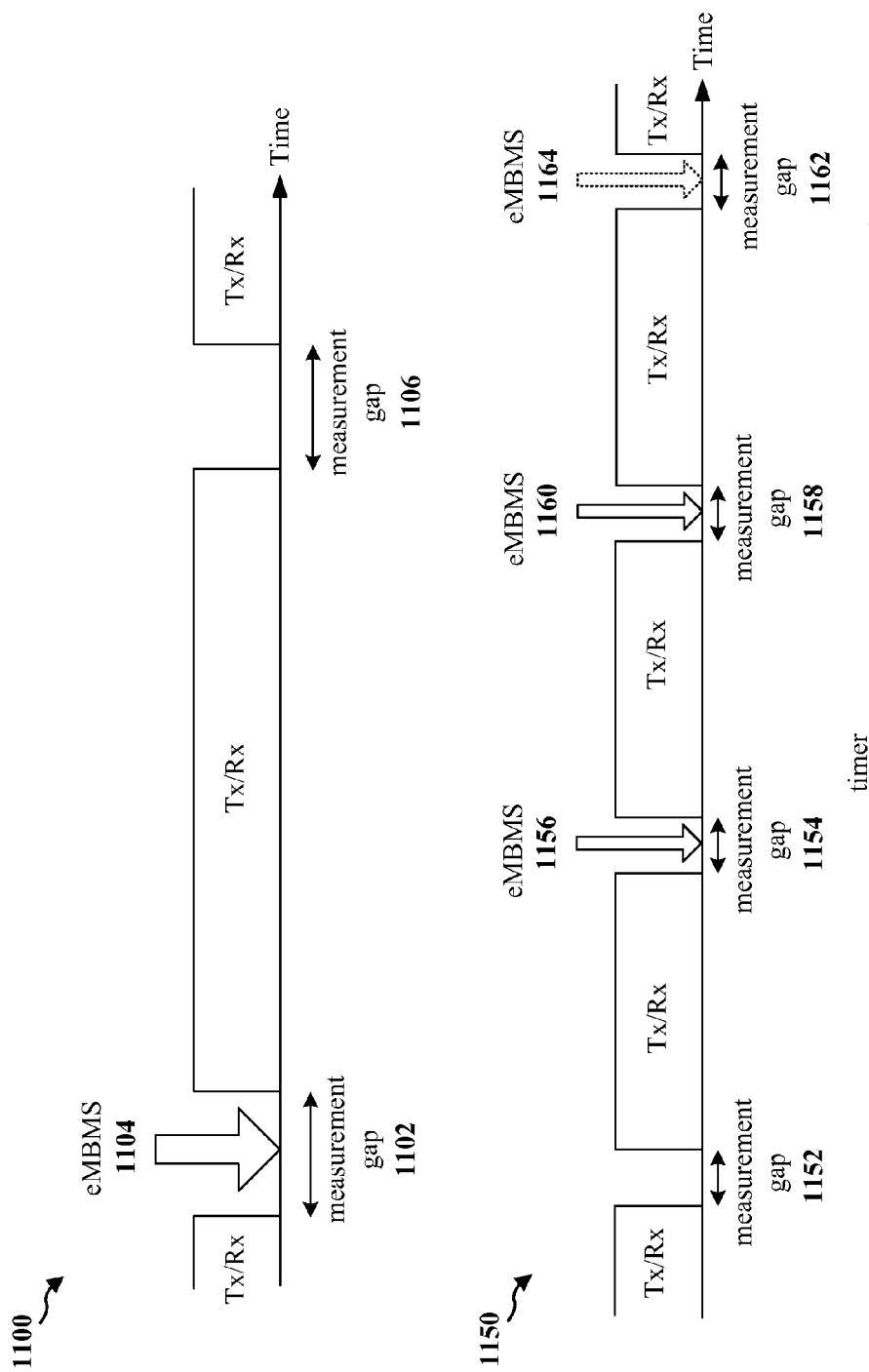
FIG. 11 is a diagram for illustrating a first method for prioritizing inter-frequency/inter-RAT measurements and reception of eMBMS content.

FIG. 11 is a diagram 1100 for illustrating a first method for prioritizing inter-frequency/inter-RAT measurements and reception of eMBMS content. The method may be performed by a UE. Because the temporal frequency (periodicity) of the measurement gap may be more frequent than reception of eMBMS content, in the first method, if there is a collision/overlap between the measurement gap and eMBMS content, the UE receives the eMBMS content and waits for the next non-conflicting gap to perform the measurement. As shown in the diagram 1100, the measurement gap 1102 overlaps with reception of the eMBMS content 1104, and therefore the UE receives the eMBMS content 1104. However, the measurement gap 1106 does not overlap with reception of eMBMS content, and therefore the UE performs a measurement during the measurement gap 1106.

To avoid the situation in which a UE does not have a chance to perform the measurement due to the prioritization of receiving eMBMS content, the UE may start a timer since a last measurement, and once the timer expires, the UE may prioritize performing the measurement over reception of eMBMS content. Implementation of the timer will result in the measurement being performed at least once per some time duration set by the timer. As shown in the diagram 1150, the UE performs a measurement during the measurement gap 1152 and starts a timer. The UE prioritizes receiving the eMBMS content 1156 over performing the measurement during the measurement gap 1154, and therefore receives the eMBMS content 1156 instead of performing the measurement. The UE prioritizes receiving the eMBMS content 1160 over performing the measurement during the measurement gap 1158, and therefore receives the eMBMS content 1160 instead of performing the measurement. However, upon expiration of the timer, the UE prioritizes performing the measurement over receiving the eMBMS content 1164 during the measurement gap 1162, and therefore performs the measurement instead of receiving the eMBMS content 1164.

Figure 12:
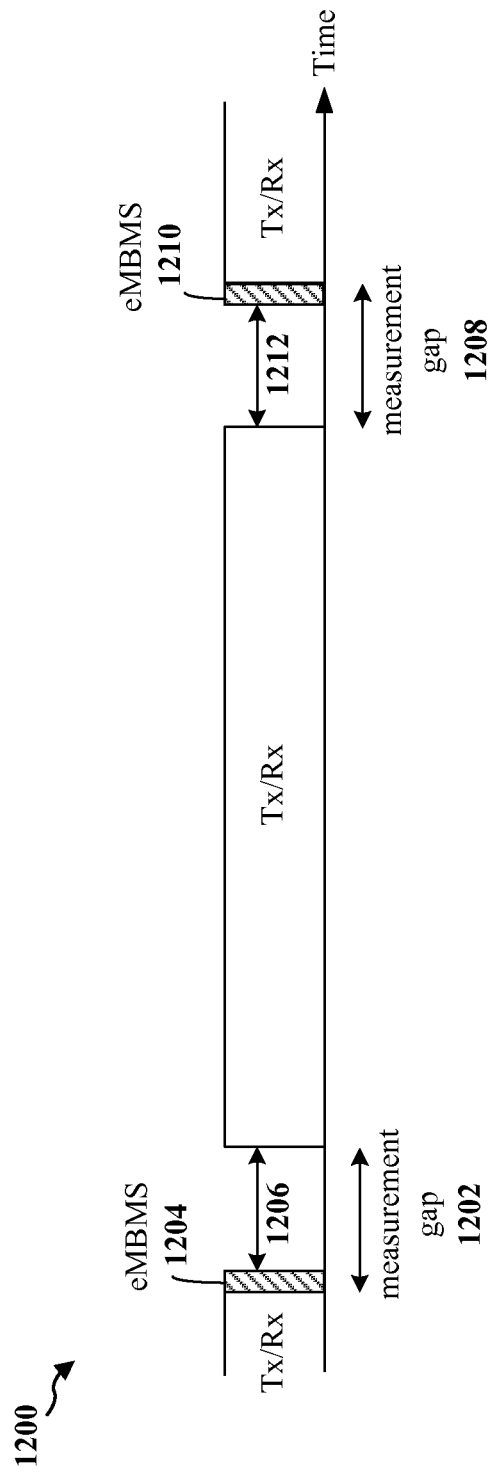
FIG. 12 is a diagram for illustrating a second method for prioritizing inter-frequency/inter-RAT measurements and reception of eMBMS content.

FIG. 12 is a diagram 1200 for illustrating a second method for prioritizing inter-frequency/inter-RAT measurements and reception of eMBMS content. The method may be performed by a UE. To receive MSI, MCCH, the notification of MCCH change message, and the SIB13, the UE may take only 1 ms or so. The UE may need a few subframes (1 ms/subframe) to receive MTCH. According to the second method, if eMBMS content partially overlaps with the measurement gap, and there is enough time in a remaining non-overlapping portion of the measurement gap to perform the measurement, the UE receives the eMBMS content and performs the measurement in the shortened measurement gap. As shown in FIG. 12, the eMBMS content 1204 partially overlaps with the measurement gap 1202, leaving a remaining non-overlapped shortened portion of the measurement gap 1206. If the UE has enough time to perform the measurement in the shortened measurement gap 1206, the UE receives the eMBMS content 1204 during the measurement gap 1202 and performs the measurement during the shortened measurement gap 1206. Furthermore, as shown in FIG. 12, the eMBMS content 1210 partially overlaps with the measurement gap 1208, leaving a remaining non-overlapped shortened portion of the measurement gap 1212. If the UE has enough time to perform the measurement in the shortened measurement gap 1212, the UE performs the measurement during the shortened measurement gap 1212 and subsequently receives the eMBMS content 1210 during a remaining portion of the measurement gap 1208.

If the UE determines that the shortened measurement gap 1206 or 1212 does not provide sufficient time for performing the measurement, the UE may prioritize performing the measurement over receiving the eMBMS content, may prioritize receiving the eMBMS content over performing the measurement, or may revert to performing one of the other methods.

Figure 13:
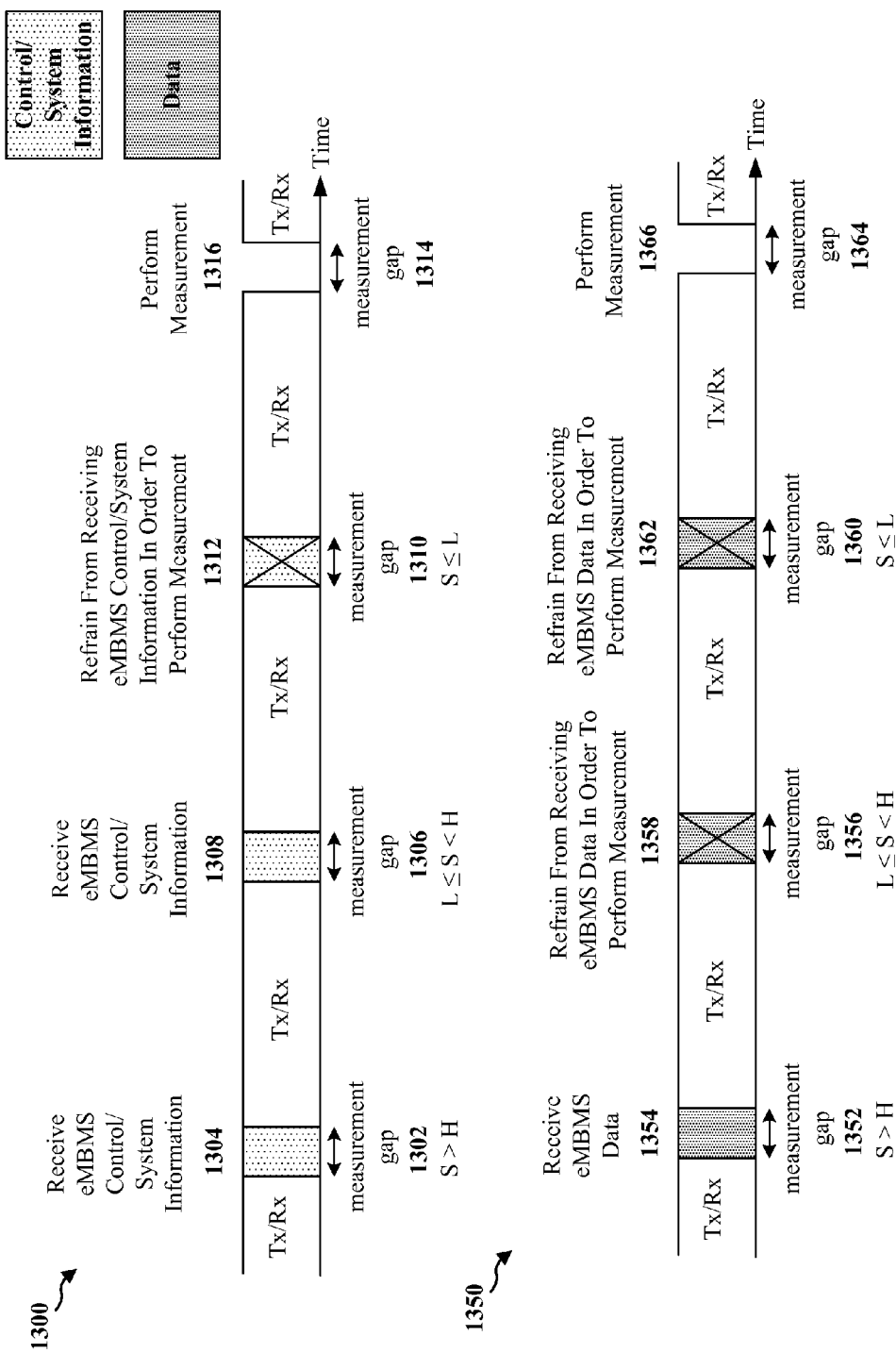
FIG. 13 is a first diagram for illustrating a third method for prioritizing inter-frequency/inter-RAT measurements and reception of eMBMS content.

FIG. 13 is a first diagram 1300 for illustrating a third method for prioritizing inter-frequency/inter-RAT measurements and reception of eMBMS content. The method may be performed by a UE. In the third method, the UE may consider the type of eMBMS content and the signal quality from the serving cell to determine how to prioritize performing the inter-frequency/inter-RAT measurement and receiving eMBMS content. The UE may prioritize eMBMS control/system information (SIB13, notification of MCCH change, MCCH, and/or MSI) as high priority and eMBMS data (MTCH) as low priority. According to the third method, the UE determines the signal quality S (e.g., reference signal received power (RSRP) or reference signal received quality (RSRQ)).

If S is greater than an upper threshold H (S>H), the UE prioritizes receiving both overlapping eMBMS control/system information and overlapping eMBMS data over performing the measurement. If S is less than or equal to the upper threshold H, but greater than a lower threshold L (L<S≤H), the UE prioritizes receiving overlapping eMBMS control/system information over performing the measurement and prioritizes performing the measurement over receiving overlapping eMBMS data. Accordingly, when the measurement gap overlaps with eMBMS data, the UE performs the measurement, and when the measurement gap overlaps with eMBMS control/system information, the UE receives the eMBMS control/system information. However, if both eMBMS control/system information and eMBMS data overlap with the measurement gap and the UE would not have enough time to perform the measurement if the UE were to refrain from receiving the eMBMS data, the UE also receives overlapping eMBMS data. If S is less than or equal to the lower threshold L (S≤L), the UE prioritizes performing the measurement over receiving the eMBMS control/system information and/or the eMBMS data, as a need for an inter-frequency or inter-RAT handover may be imminent.

For example, as shown in the diagram 1300, in the measurement gap 1302, the UE determines that S>H, so the UE receives the eMBMS control/system information 1304 rather than perform the measurement. In the measurement gap 1306, the UE determines that L<S≤H, so the UE receives the eMBMS control/system information 1308 rather than perform the measurement. In the measurement gap 1310, the UE determines that S≤L, so the UE performs the measurement rather than receive the eMBMS control/system information 1312. In the measurement gap 1314, the UE performs the measurement 1316, as there is no overlapping/colliding eMBMS control/system information.

For another example, as shown in the diagram 1350, in the measurement gap 1352, the UE determines that S>H, so the UE receives the eMBMS data 1354 rather than perform the measurement. In the measurement gap 1356, the UE determines that L<S≤H, so the UE performs the measurement rather than receive the eMBMS data 1358. In the measurement gap 1360, the UE determines that S≤L, so the UE performs the measurement rather than receive the eMBMS data 1362. In the measurement gap 1364, the UE performs the measurement 1366, as there is no overlapping/colliding eMBMS data.

Figure 14:
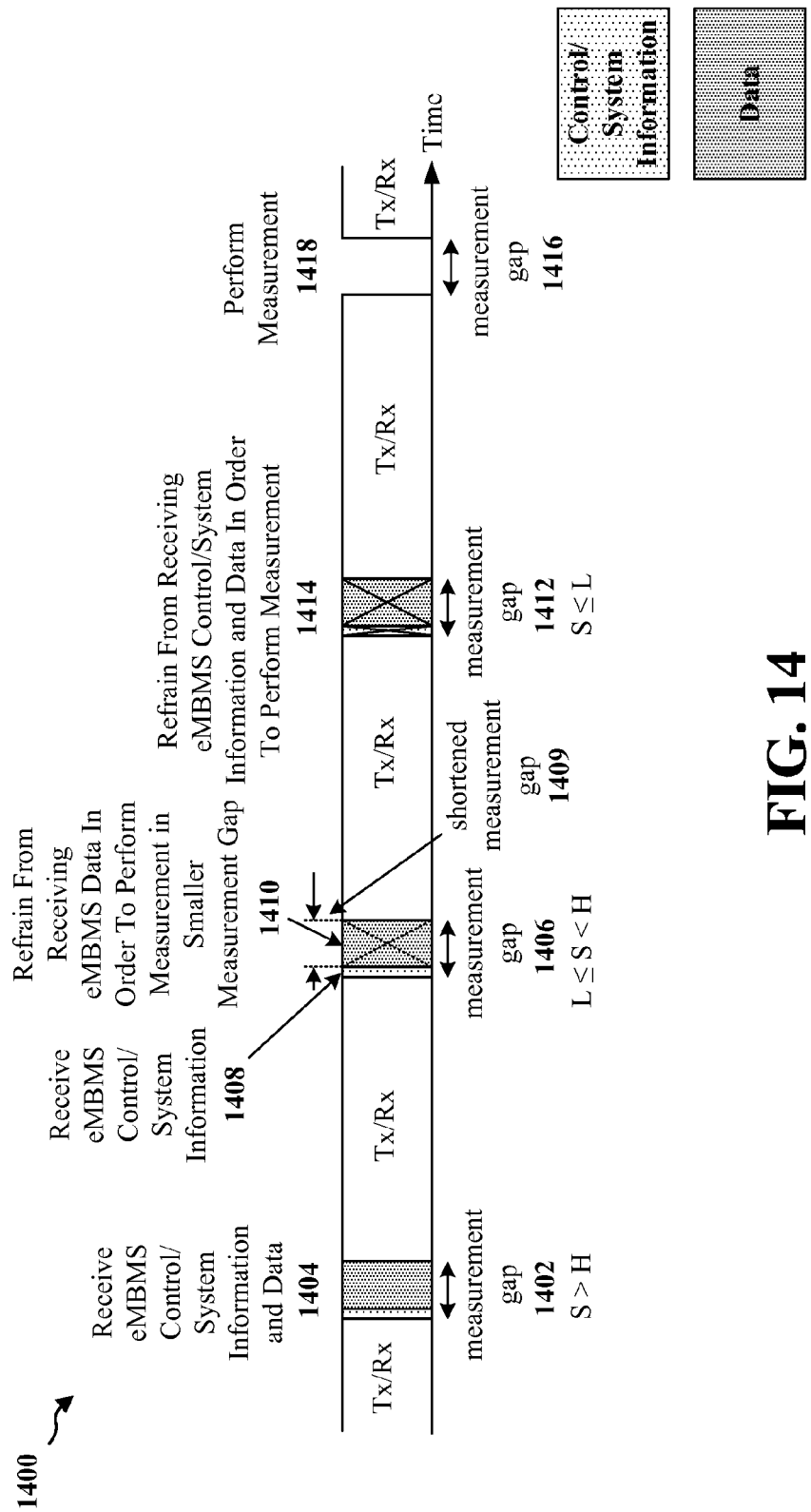
FIG. 14 is a second diagram for illustrating the third method for prioritizing inter-frequency/inter-RAT measurements and reception of eMBMS content.

FIG. 14 is a second diagram 1400 for illustrating the third method for prioritizing inter-frequency/inter-RAT measurements and reception of eMBMS content. As shown in FIG. 14, for the measurement gap 1402, the UE determines that S>H, and therefore the UE receives eMBMS control/system information and eMBMS data 1404. For the measurement gap 1406, the UE determines that L<S<H, and therefore the UE receives eMBMS control/system information 1408. If the UE is able to perform a measurement in the shortened measurement gap 1409, the UE performs the measurement rather than receive the eMBMS data 1410. However, if the UE is unable to perform a measurement in the shortened measurement gap 1409, the UE receives the eMBMS data. For the measurement gap 1412, the UE determines that S≤L, so the UE performs the measurement rather than receive the eMBMS control/system information and eMBMS data 1414. For the measurement gap 1416, there is no overlapping eMBMS content, so the UE performs the measurement 1418.

Figure 15:
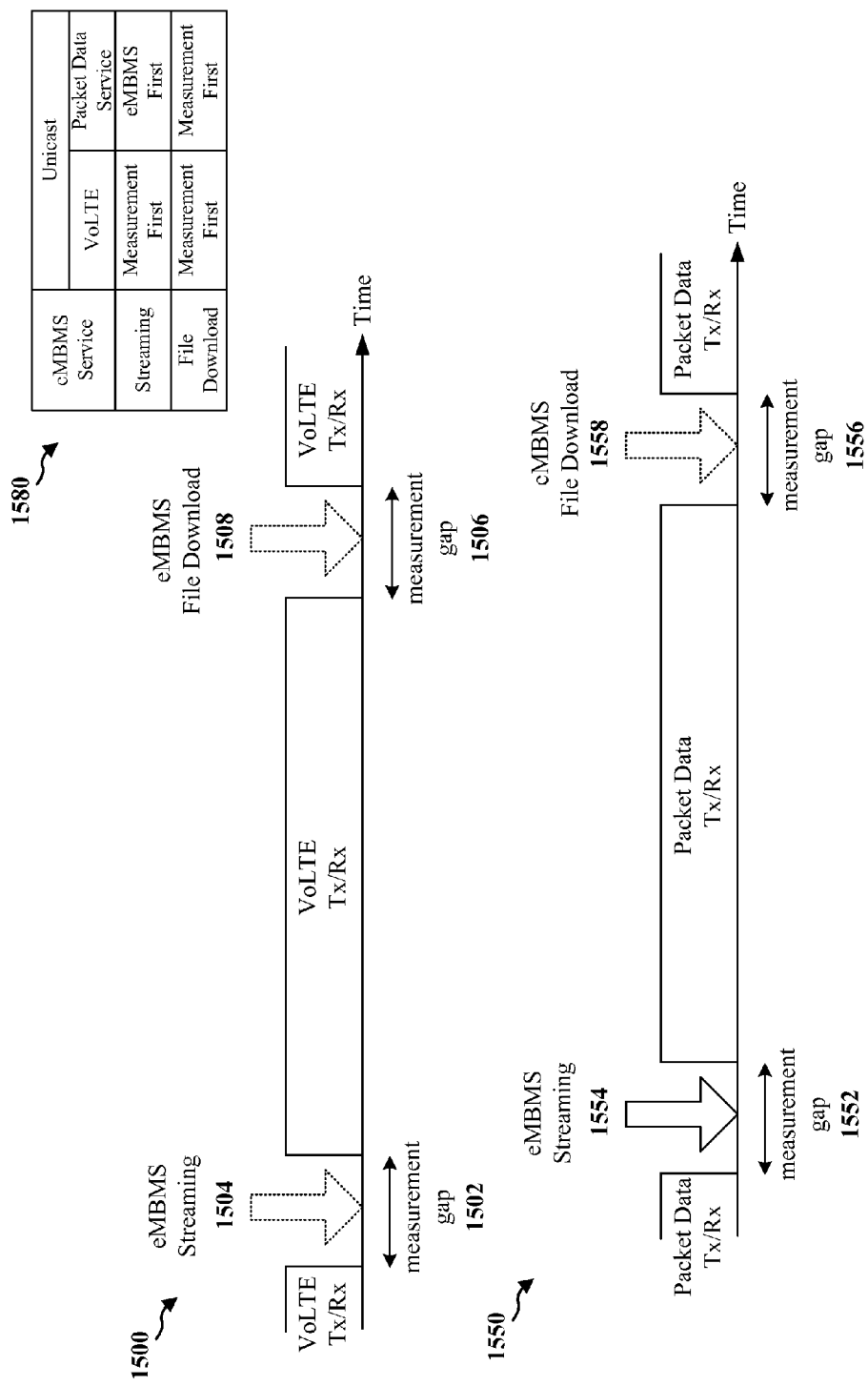
FIG. 15 is a diagram for illustrating a fourth method for prioritizing inter-frequency/inter-RAT measurements and reception of eMBMS content.

FIG. 15 is a diagram 1500 for illustrating a fourth method for prioritizing inter-frequency/inter-RAT measurements and reception of eMBMS content. The method may be performed by a UE. In the fourth method, the UE prioritizes receiving eMBMS content and performing the measurement based on whether the eMBMS service is for streaming or file download and whether the unicast service is Voice over LTE (VoLTE) or packet data service. As shown in the diagram 1580, when the unicast service is VoLTE, the UE prioritizes the inter-frequency/inter-RAT measurement first over both streaming eMBMS service and file download eMBMS service. When the unicast service is packet data service, the UE prioritizes the inter-frequency/inter-RAT measurement first over file download eMBMS service, and prioritizes streaming eMBMS service first over the inter-frequency/inter-RAT measurement.

For example, as shown in the diagram 1500, while the UE's unicast service is VoLTE, the UE refrains from receiving the streaming eMBMS service 1504 during the measurement gap 1502 in order to perform an inter-frequency/inter-RAT measurement during the measurement gap 1502. While the UE's unicast service is VoLTE, the UE refrains from receiving the file download eMBMS service 1508 during the measurement gap 1506 in order to perform an inter-frequency/inter-RAT measurement during the measurement gap 1506. As shown in the diagram 1550, while the UE's unicast service is packet data service, the UE refrains from performing the inter-frequency/inter-RAT measurement during the measurement gap 1552 in order to receive the streaming eMBMS service 1554 during the measurement gap 1552. Lastly, while the UE's unicast service is packet data service, the UE refrains from receiving the file download eMBMS service 1558 during the measurement gap 1556 in order to perform an inter-frequency/inter-RAT measurement during the measurement gap 1556.

Combinations of the four methods, discussed supra, may be possible. For example, a UE may prioritize streaming eMBMS service when the unicast service is a packet data service only when S is determined to be greater than a lower threshold (S>L). Other combinations are also possible.

Figure 16:
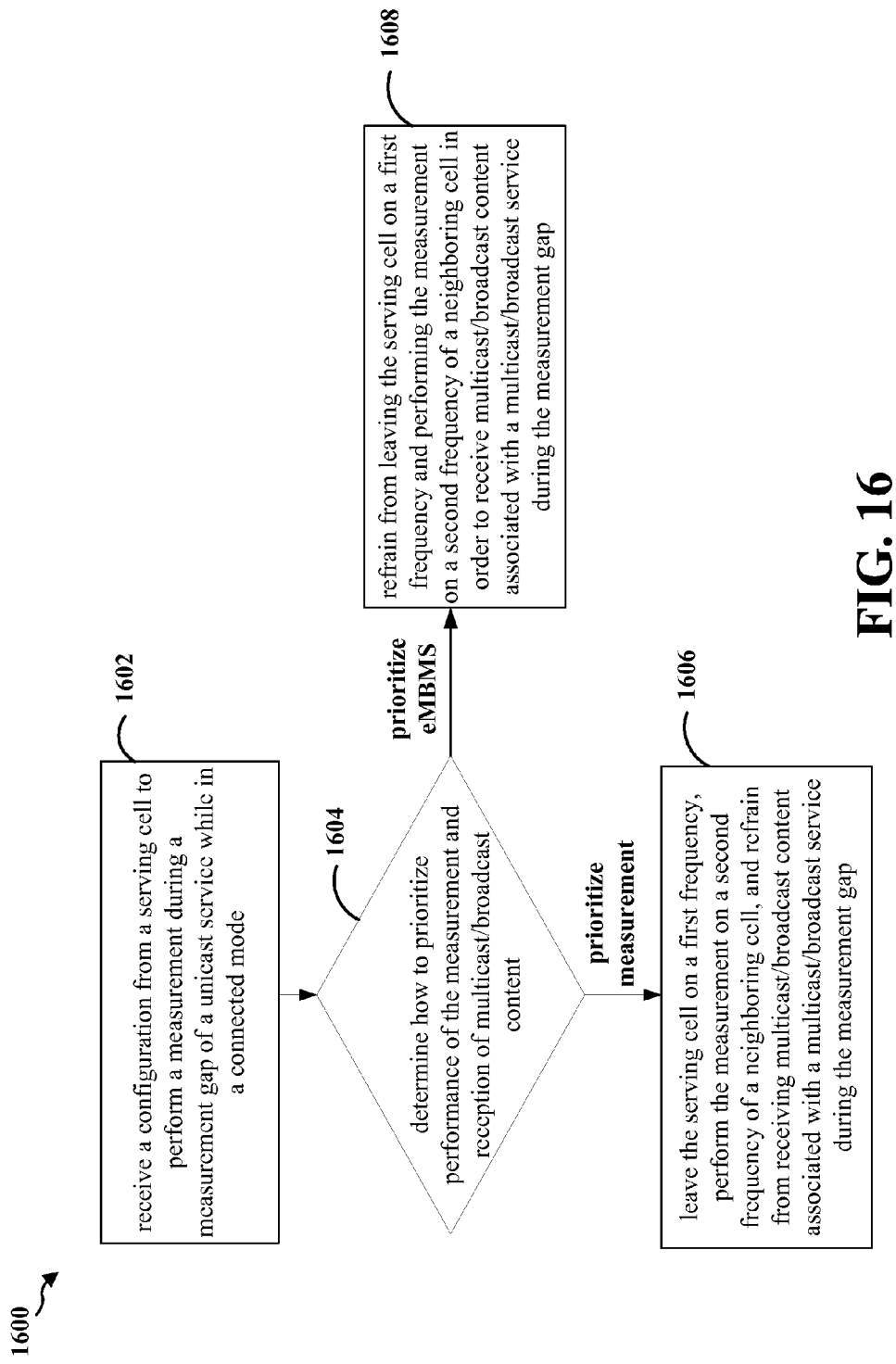
FIG. 16 is a flow chart of the first, second, third, and fourth methods of wireless communication for prioritizing inter-frequency/inter-RAT measurements and reception of multicast/broadcast content.

FIG. 16 is a flow chart 1600 of the first, second, third, and fourth methods of wireless communication for prioritizing inter-frequency/inter-RAT measurements and reception of multicast/broadcast content. The method may be performed by a UE. As shown in FIG. 16, in step 1602, the UE receives a configuration from a serving cell to perform an inter-frequency/inter-RAT measurement during a measurement gap of a unicast service while in a connected mode. In step 1604, the UE determines how to prioritize performance of the measurement and reception of multicast/broadcast content. If the UE prioritizes performance of the measurement over reception of the multicast/broadcast content, the UE performs step 1606, and leaves the serving cell on a first frequency, performs the measurement on a second frequency of a neighboring cell, and refrains from receiving multicast/broadcast content associated with a multicast/broadcast service during the measurement gap. If the UE prioritizes reception of the multicast/broadcast content over performance of the measurement, the UE performs step 1608, and refrains from leaving the serving cell on a first frequency and performing the measurement on a second frequency of a neighboring cell in order to receive multicast/broadcast content associated with a multicast/broadcast service during the measurement gap.

Figure 17:
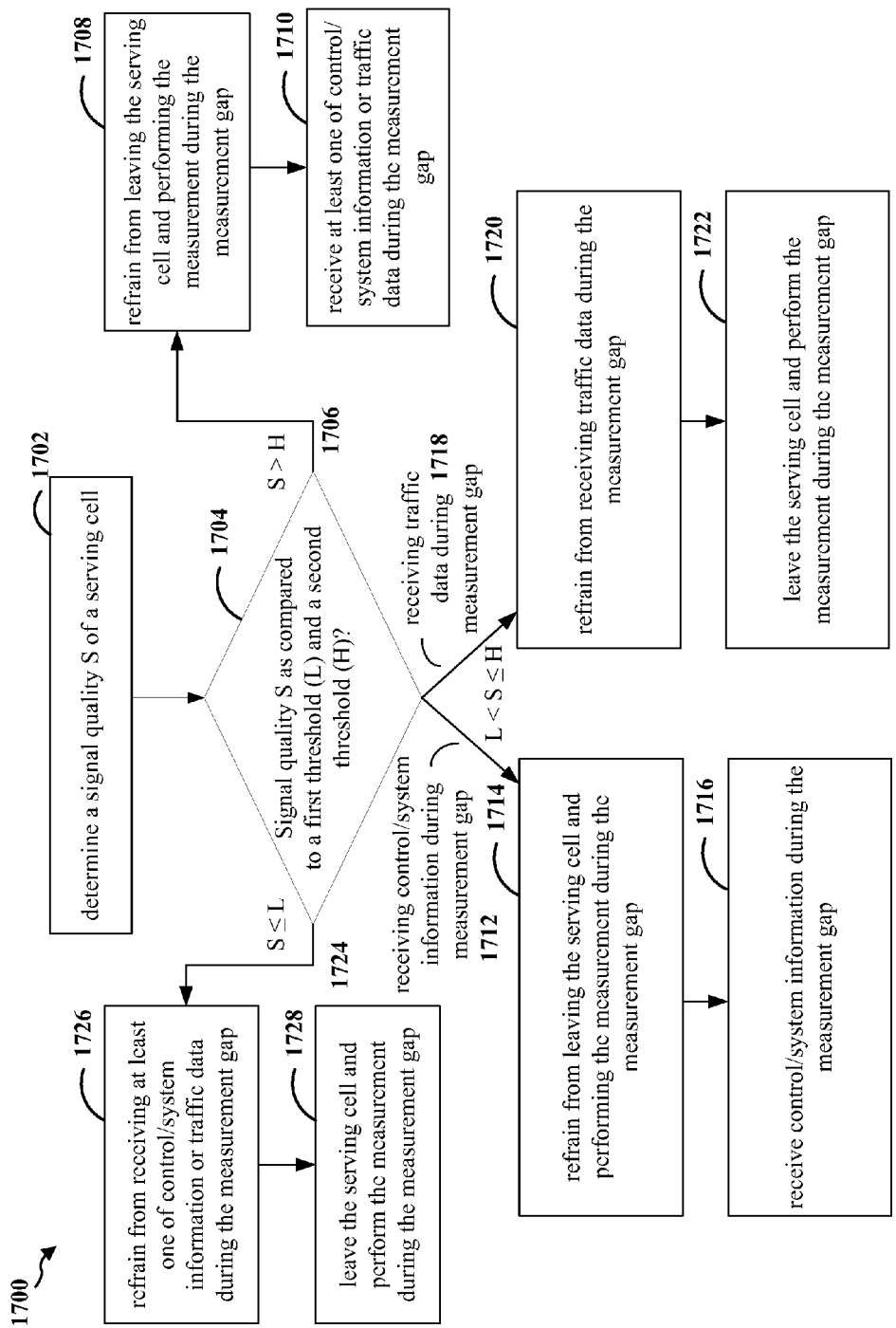
FIG. 17 is a flow chart of the third method of wireless communication for prioritizing inter-frequency/inter-RAT measurements and reception of multicast/broadcast content.

FIG. 17 is a flow chart 1700 of the third method of wireless communication for prioritizing inter-frequency/inter-RAT measurements and reception of multicast/broadcast content. The method may be performed by a UE. In this method, the UE determines whether to refrain from leaving the serving cell and performing the measurement based on a signal quality S of the serving cell, and an overlap of the measurement gap and a reception of at least one of control/system information or traffic data of the multicast/broadcast content. In step 1702, the UE determines the signal quality S of the serving cell and compares the signal quality S to a first threshold L and a second threshold H. When the reception of the at least one of the control/system information or the traffic data overlaps with the measurement gap and the signal quality S is greater than the second threshold H (S>H) 1706, the UE performs step 1708 and refrains from leaving the serving cell and performing the measurement during the measurement gap. In step 1710, the UE receives the at least one of the control/system information or the traffic data during the measurement gap. When the reception of the control/system information overlaps with the measurement gap and the signal quality S is greater than the first threshold L and less than or equal to the second threshold H (L<S≤H) 1712, the UE performs step 1714 and refrains from leaving the serving cell and performing the measurement during the measurement gap. In step 1716, the UE receives the control/system information during the measurement gap. When the reception of the traffic data overlaps with the measurement gap and the signal quality S is greater than the first threshold L and less than or equal to the second threshold H (L<S≤H) 1718, the UE performs step 1720 and refrains from receiving the traffic data during the measurement gap. In step 1722, the UE leaves the serving cell and performs the measurement during the measurement gap.

However, as discussed supra in relation to FIG. 14, if both control/system information and traffic data partially overlap the measurement gap, the UE may perform steps 1714, 1716 for the control/system information, and perform steps 1720, 1722 only when the UE is able to perform the measurement during the shortened measurement gap (i.e., the portion of the measurement gap that overlaps with the traffic data). When the UE is unable to perform the measurement during the shortened measurement gap, the UE may refrain from leaving the serving cell and performing the measurement during the shortened measurement gap in order to receive traffic data during the shortened measurement gap.

Finally, when the reception of the at least one of the control/system information or the traffic data overlaps with the measurement gap and the signal quality S is less than or equal to the first threshold L (S≤L) 1724, the UE performs step 1726 and refrains from receiving the at least one of the control/system information or the traffic data during the measurement gap. In step 1728, the UE leaves the serving cell and performs the measurement during the measurement gap.

Figure 18:
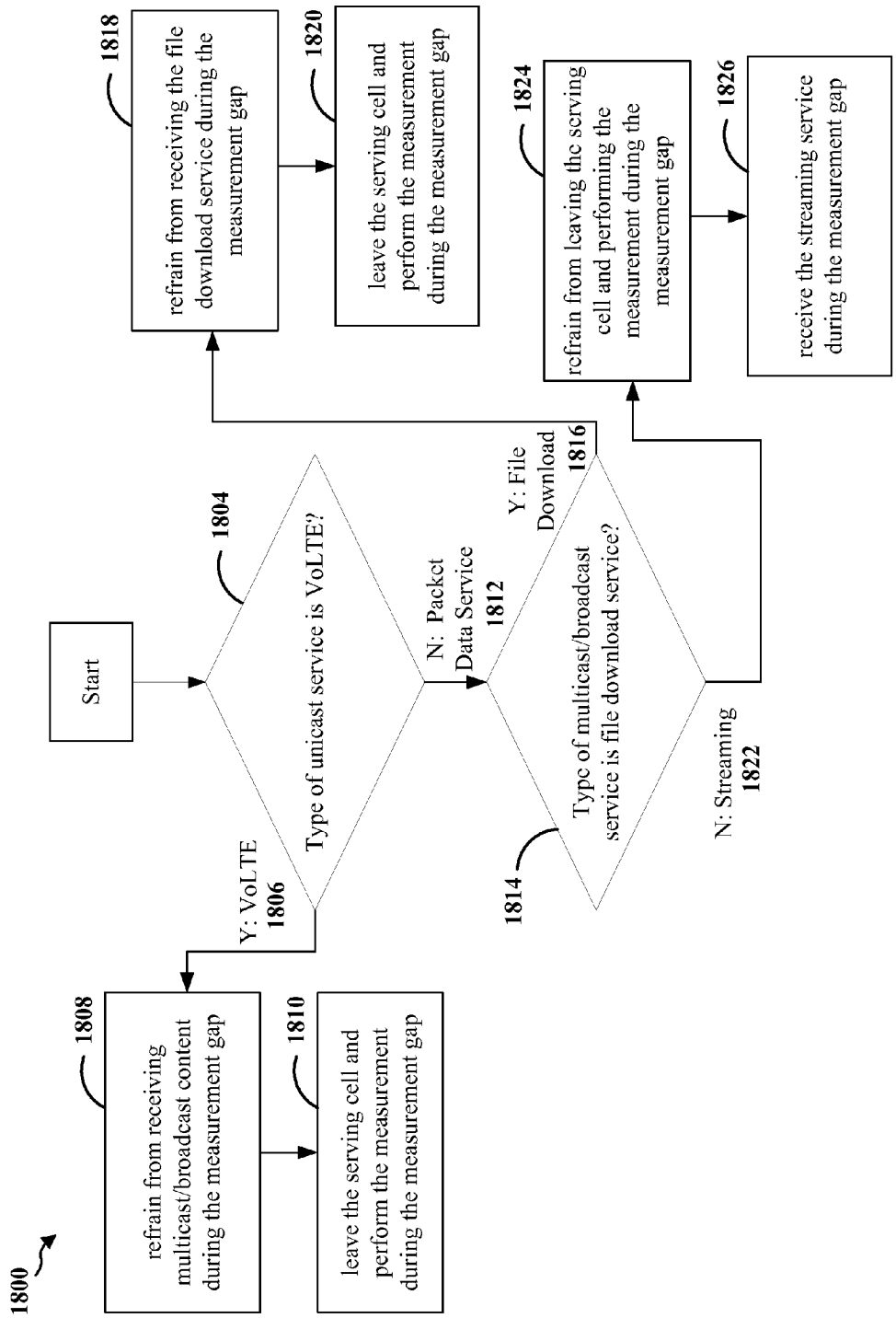
FIG. 18 is a flow chart of the fourth method of wireless communication for prioritizing inter-frequency/inter-RAT measurements and reception of multicast/broadcast content.

FIG. 18 is a flow chart 1800 of the fourth method of wireless communication for prioritizing inter-frequency/inter-RAT measurements and reception of multicast/broadcast content. The method may be performed by a UE. In the fourth method, the UE determines whether to refrain from leaving the serving cell and performing the measurement based on at least one of a type of the unicast service or a type of the multicast/broadcast service. As shown in FIG. 18, in step 1804, the UE determines whether the type of unicast service is VoLTE. When the type of unicast service is VoLTE service 1806, in step 1808, the UE refrains from receiving the multicast/broadcast content during the measurement gap. In step 1810, the UE leaves the serving cell and performs the measurement during the measurement gap. When the type of unicast service is packet data service 1812, in step 1814, the UE determines whether the type of multicast/broadcast service is file download service. If the type of multicast/broadcast service is file download service 1816, in step 1818, the UE refrains from receiving the file download service during the measurement gap. In step 1820, the UE leaves the serving cell and performs the measurement during the measurement gap. However, if the type of multicast/broadcast service is a streaming service 1822, in step 1824, the UE refrains from leaving the serving cell and performing the measurement during the measurement gap. In step 1826, the UE receives the streaming service during the measurement gap.

Figure 19:
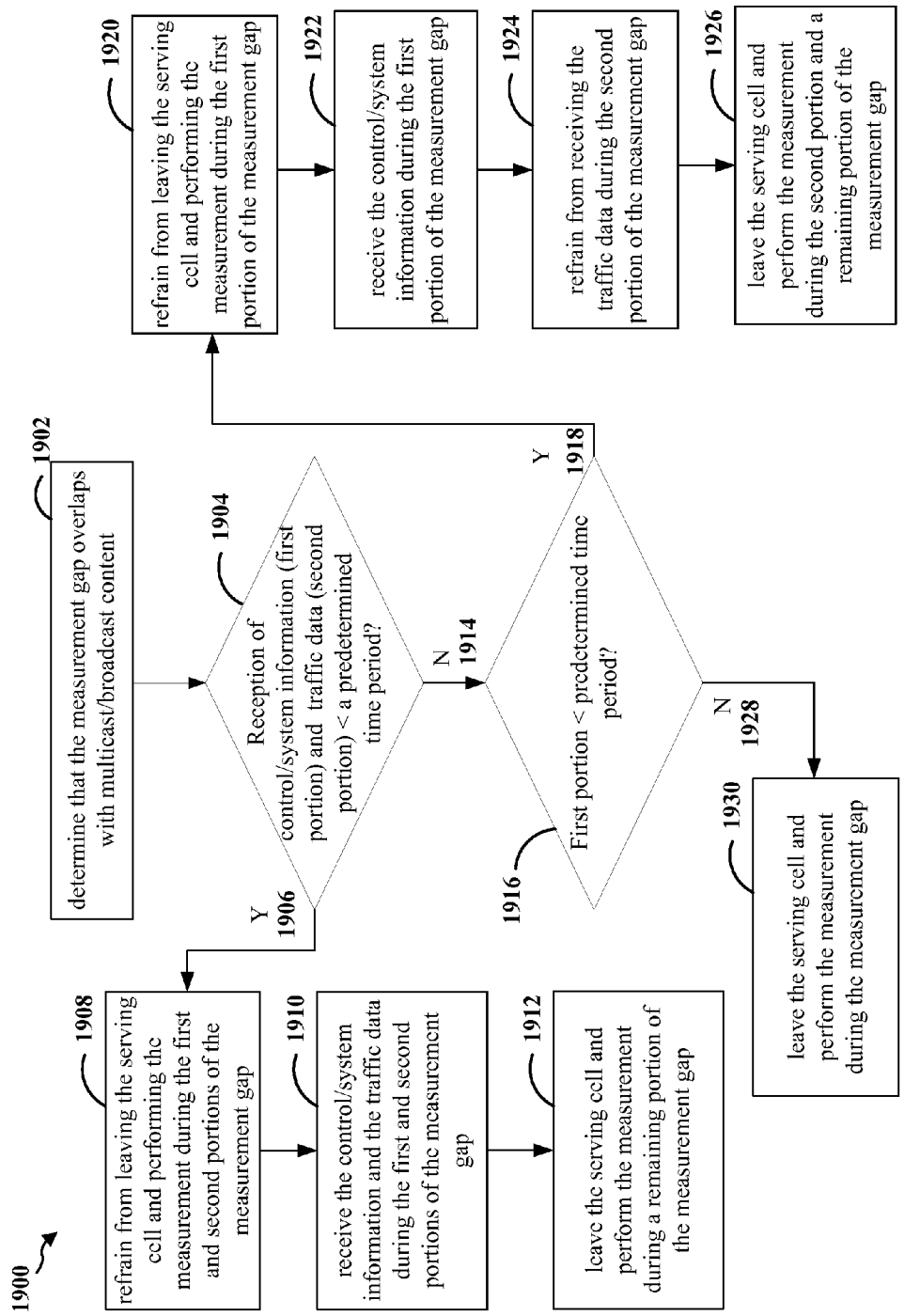
FIG. 19 is a flow chart of the second method of wireless communication for prioritizing inter-frequency/inter-RAT measurements and reception of multicast/broadcast content.

FIG. 19 is a flow chart 1900 of the second method of wireless communication for prioritizing inter-frequency/inter-RAT measurements and reception of multicast/broadcast content. The method may be performed by a UE. In the second method, the UE determines whether to refrain from leaving the serving cell and performing the measurement based on a time period of an overlap of the measurement gap and a reception of at least one of control/system information or traffic data of the multicast/broadcast content. As shown in FIG. 19, in step 1902, the UE determines that the measurement gap overlaps with multicast/broadcast content. In step 1904, the UE determines whether control/system information extends over a first portion and traffic data extends over a second portion of the measurement gap such that the first portion and the second portion together are less than a predetermined time period (e.g., 1 ms). When the overlap of the measurement gap and the reception of the control/system information and the traffic data extends over first and second portions, respectively, of the measurement gap that is less than a predetermined time period 1906, in step 1908, the UE refrains from leaving the serving cell and performing the measurement during the first and second portions of the measurement gap. In step 1910, the UE receives the control/system information during the first portion of the measurement gap and the traffic data during the second portion of the measurement gap. In step 1912, the UE leaves the serving cell and performs the measurement during a remaining portion of the measurement gap.

When the overlap of the measurement gap and the reception of the control/system information and the traffic data extends over first and second portions, respectively, of the measurement gap that is greater than a predetermined time period 1914, in step 1916, the UE determines whether the first portion of the measurement gap is less than the predetermined time period. When the overlap of the measurement gap and the reception of the control/system information extends over a first portion of the measurement gap, the overlap of the measurement gap and the reception of the traffic data extends over a second portion of the measurement gap, the first portion and the second portion are greater than the predetermined time period, and the first portion is less than the predetermined time period 1918, in step 1920, the UE refrains from leaving the serving cell and performing the measurement during the first portion of the measurement gap. In step 1922, the UE receives the control/system information during the first portion of the measurement gap. In step 1924, the UE refrains from receiving the traffic data during the second portion of the measurement gap. In step 1926, the UE leaves the serving cell and performs the measurement during the second portion and a remaining portion of the measurement gap. However, when the first portion is greater than the predetermined time period 1928, in step 1930, the UE leaves the serving cell and performs the measurement during the measurement gap.

Figure 20:
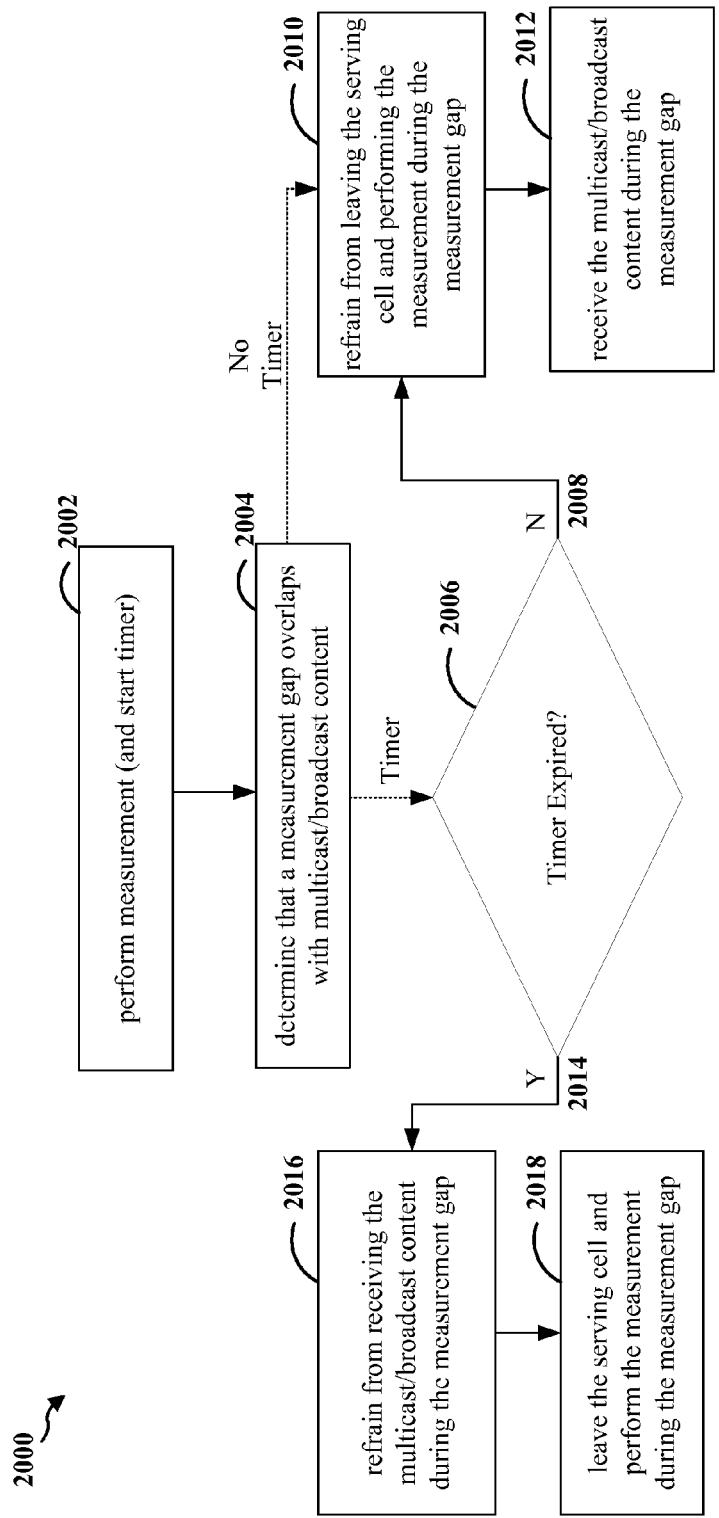
FIG. 20 is a flow chart of the first method of wireless communication for prioritizing inter-frequency/inter-RAT measurements and reception of multicast/broadcast content.

FIG. 20 is a flow chart 2000 of the first method of wireless communication for prioritizing inter-frequency/inter-RAT measurements and reception of multicast/broadcast content. The method may be performed by a UE. As shown in FIG. 20, in step 2002, the UE performs an inter-frequency/inter-RAT measurement. In step 2002, the UE may also start a timer. In step 2004, the UE determines that a measurement gap overlaps with multicast/broadcast content. If the UE started a timer in step 2002, in step 2006, the UE determines whether the timer has expired before the current measurement gap. If the timer has expired 2014, in step 2016, the UE refrains from receiving the multicast/broadcast content during the measurement gap. In step 2018, the UE leaves the serving cell and performs the measurement during the measurement gap. If the timer has not expired 2008 or no timer was started, in step 2010, the UE refrains from leaving the serving cell and performing the measurement during the measurement gap. In step 2012, the UE receives the multicast/broadcast content during the measurement gap.

Figure 21:
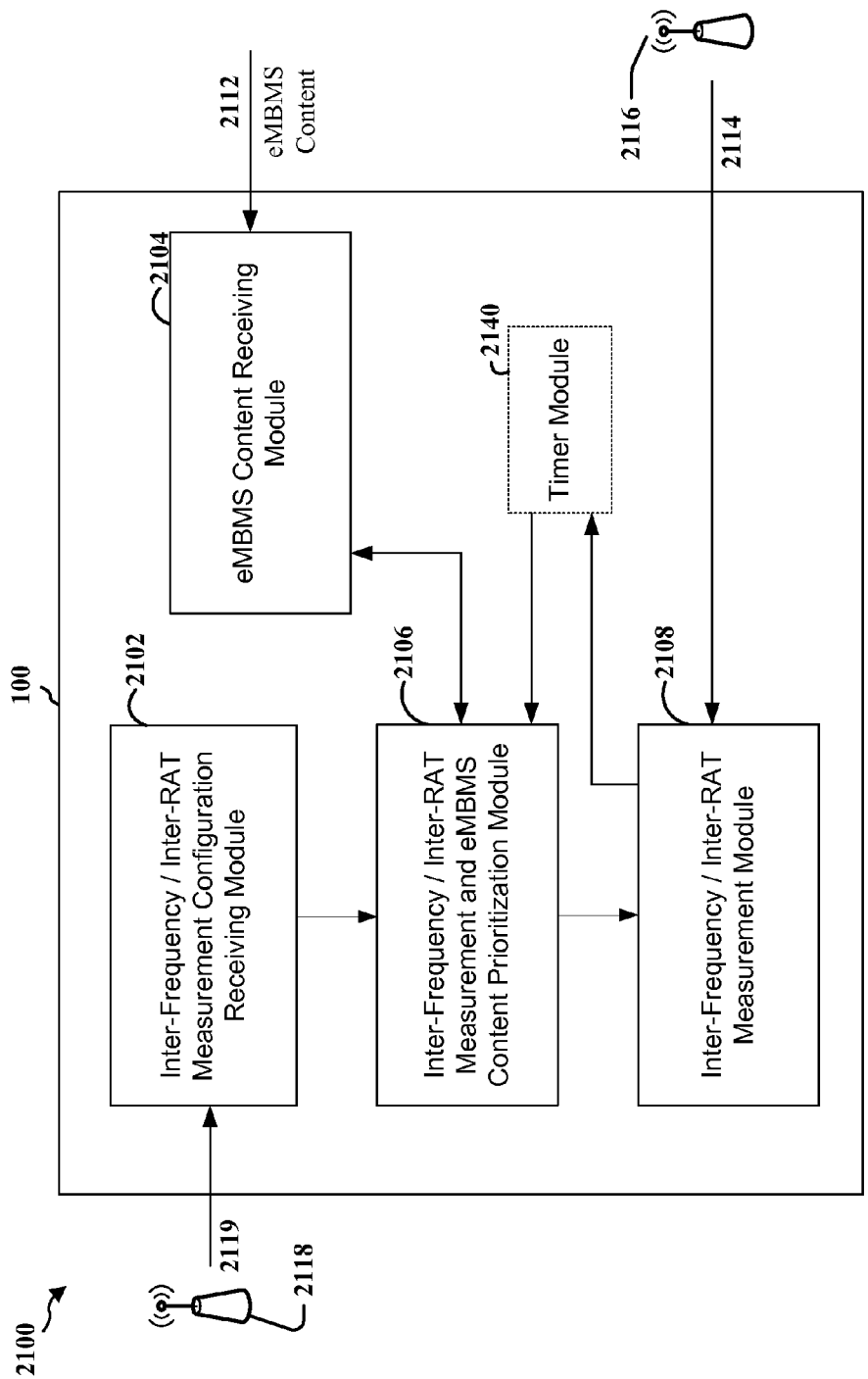
FIG. 21 is a conceptual data flow diagram illustrating the data flow between different modules/means/components in an exemplary apparatus.

FIG. 21 is a conceptual data flow diagram 2100 illustrating the data flow between different modules/means/components in an exemplary apparatus 100. The apparatus 100 includes an inter-frequency/inter-RAT measurement configuration receiving module 2102 that is configured to receive a configuration 2119 from a serving cell 2118 to perform an inter-frequency/inter-RAT measurement during a measurement gap of a unicast service while in a connected mode. The apparatus 100 further includes an inter-frequency/inter-RAT measurement and eMBMS content prioritization module 2106 that is configured to determine whether to refrain from leaving the serving cell 2118 on a first frequency and performing the measurement 2114 on a second frequency of a neighboring cell 2116 in order to receive multicast/broadcast content 2112 associated with a multicast/broadcast service during the measurement gap. The apparatus 100 further includes an inter-frequency/inter-RAT measurement module 2108 that is configured to perform an inter-frequency/inter-RAT measurement 2114 on a second frequency of a neighboring cell 2116 during a measurement gap. The apparatus 100 further includes an eMBMS content receiving module 2104 that is configured to receive eMBMS content 2112. The inter-frequency/inter-RAT measurement and eMBMS content prioritization module 2106 receives information from the eMBMS content receiving module 2104 related to the timing of eMBMS content and determines whether the eMBMS content 2112 overlaps with a measurement gap. The inter-frequency/inter-RAT measurement and eMBMS content prioritization module 2106 determines how to prioritize receiving eMBMS content 2112 and the performance of inter-frequency/inter-RAT measurements 2114 and communicates the decision to the eMBMS content receiving module 2104 and the inter-frequency/inter-RAT measurement module 2108. The inter-frequency/inter-RAT measurement and eMBMS content prioritization module 2106 may be configured to prioritize the receiving of eMBMS content 2112 and the performance of the inter-frequency/inter-RAT measurements 2114 based on at least one of the first, second, third, and/or fourth methods, discussed supra. In relation to the first method, the apparatus 100 may further include a timer module 2140 that is configured to start a timer upon performing an inter-frequency/inter-RAT measurement 2114 and communicate expiration of the timer to the inter-frequency/inter-RAT measurement and eMBMS content prioritization module 2106.

The apparatus may include additional modules that perform each of the steps of the algorithm in the aforementioned flow charts. As such, each step in the aforementioned flow charts may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 22:
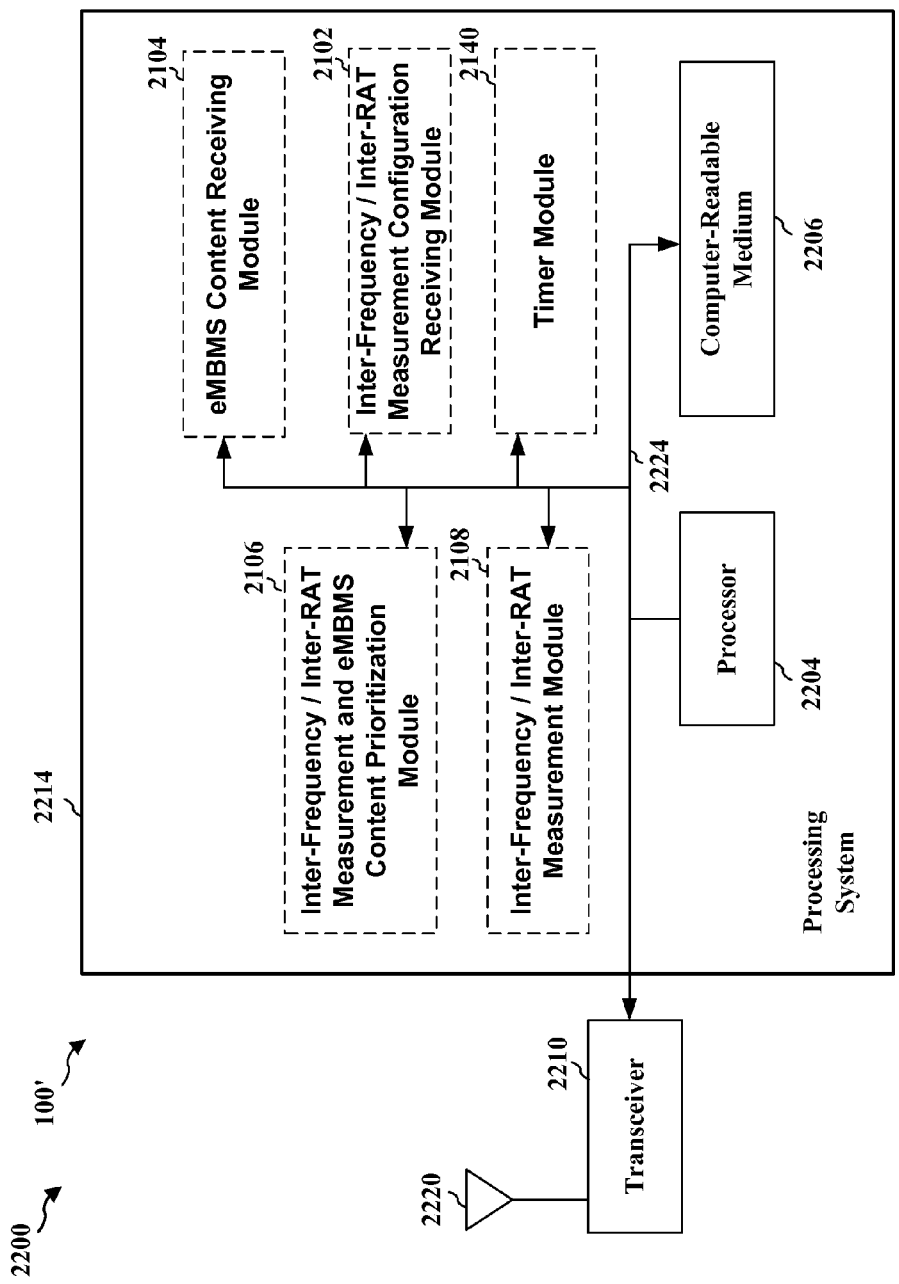
FIG. 22 is a diagram illustrating an example of a hardware implementation for an apparatus employing a processing system.

FIG. 22 is a diagram 2200 illustrating an example of a hardware implementation for an apparatus 100' employing a processing system 2214. The processing system 2214 may be implemented with a bus architecture, represented generally by the bus 2224. The bus 2224 may include any number of interconnecting buses and bridges depending on the specific application of the processing system 2214 and the overall design constraints. The bus 2224 links together various circuits including one or more processors and/or hardware modules, represented by the processor 2204, the modules 2102, 2104, 2106, 2108, 2140 and the computer-readable medium 2206. The bus 2224 may also link various other circuits such as timing sources, peripherals, voltage regulators, and power management circuits, which are well known in the art, and therefore, will not be described any further.

The processing system 2214 may be coupled to a transceiver 2210. The transceiver 2210 is coupled to one or more antennas 2220. The transceiver 2210 provides a means for communicating with various other apparatus over a transmission medium. The processing system 2214 includes a processor 2204 coupled to a computer-readable medium 2206. The processor 2204 is responsible for general processing, including the execution of software stored on the computer-readable medium 2206. The software, when executed by the processor 2204, causes the processing system 2214 to perform the various functions described supra for any particular apparatus. The computer-readable medium 2206 may also be used for storing data that is manipulated by the processor 2204 when executing software. The processing system further includes at least one of the modules 2102, 2104, 2106, 2108, and 2140. The modules may be software modules running in the processor 2204, resident/stored in the computer readable medium 2206, one or more hardware modules coupled to the processor 2204, or some combination thereof. The processing system 2214 may be a component of the UE 650 and may include the memory 660 and/or at least one of the TX processor 668, the RX processor 656, and the controller/processor 659.

In one configuration, the apparatus 100/100' for wireless communication includes means for receiving a configuration from a serving cell to perform a measurement during a measurement gap of a unicast service while in a connected mode. The apparatus further includes means for determining whether to refrain from leaving the serving cell on a first frequency and performing the measurement on a second frequency of a neighboring cell in order to receive multicast/broadcast content associated with a multicast/broadcast service during the measurement gap. The apparatus may further include means for receiving multicast/broadcast content and means for performing an inter-frequency/inter-RAT measurement. The apparatus may further include means for starting the timer upon a previous measurement. The aforementioned means may be one or more of the aforementioned modules of the apparatus 100 and/or the processing system 2214 of the apparatus 100' configured to perform the functions recited by the aforementioned means. As described supra, the processing system 2214 may include the TX Processor 668, the RX Processor 656, and the controller/processor 659. As such, in one configuration, the aforementioned means may be the TX Processor 668, the RX Processor 656, and the controller/processor 659 configured to perform the functions recited by the aforementioned means.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication, comprising:
    receiving a configuration from a serving cell to perform a measurement during a measurement gap of a unicast service while in a connected mode; and
    determining whether to refrain from leaving the serving cell on a first frequency and performing the measurement on a second frequency of a neighboring cell in order to receive multicast/broadcast content associated with a multicast/broadcast service during the measurement gap,
    wherein the determination whether to refrain from leaving the serving cell and performing the measurement is based on a signal quality of the serving cell, and an overlap of the measurement gap and a reception of at least one of control/system information or traffic data of the multicast/broadcast content, and
    wherein when the reception of the control/system information overlaps with the measurement gap and the signal quality is greater than a first threshold and less than or equal to a second threshold, the method further comprises:
        refraining from leaving the serving cell and performing the measurement during the measurement gap; and
        receiving the control/system information during the measurement gap.

2. The method of claim 1, wherein when the reception of said at least one of the control/system information or the traffic data overlaps with the measurement gap and the signal quality is greater than a threshold, the method further comprises:
    refraining from leaving the serving cell and performing the measurement during the measurement gap; and
    receiving said at least one of the control/system information or the traffic data during the measurement gap.

3. The method of claim 1, wherein when the reception of said at least one of the control/system information or the traffic data overlaps with the measurement gap and the signal quality is less than or equal to a threshold, the method further comprises:
    refraining from receiving said at least one of the control/system information or the traffic data during the measurement gap; and
    leaving the serving cell and performing the measurement during the measurement gap.

4. The method of claim 1, wherein when the reception of the multicast/broadcast content overlaps with the measurement gap, the method further comprises:
    refraining from leaving the serving cell and performing the measurement during the measurement gap; and
    receiving the multicast/broadcast content during the measurement gap.

5. The method of claim 1, wherein the determination whether to refrain from leaving the serving cell and performing the measurement is based on a timer.

6. A method of wireless communication, comprising:
    receiving a configuration from a serving cell to perform a measurement during a measurement gap of a unicast service while in a connected mode; and
    determining whether to refrain from leaving the serving cell on a first frequency and performing the measurement on a second frequency of a neighboring cell in order to receive multicast/broadcast content associated with a multicast/broadcast service during the measurement gap,
    wherein the determination whether to refrain from leaving the serving cell and performing the measurement is based on a signal quality of the serving cell, and an overlap of the measurement gap and a reception of at least one of control/system information or traffic data of the multicast/broadcast content, and
    wherein when the reception of the traffic data overlaps with the measurement gap and the signal quality is greater than a first threshold and less than or equal to a second threshold, the method further comprises:
refraining from receiving the traffic data during the measurement gap; and
leaving the serving cell and performing the measurement during the measurement gap.

7. A method of wireless communication, comprising:
receiving a configuration from a serving cell to perform a measurement during a measurement gap of a unicast service while in a connected mode; and
determining whether to refrain from leaving the serving cell on a first frequency and performing the measurement on a second frequency of a neighboring cell in order to receive multicast/broadcast content associated with a multicast/broadcast service during the measurement gap,
wherein the determination whether to refrain from leaving the serving cell and performing the measurement is based on at least one of a type of the unicast service or a type of the multicast/broadcast service.

8. The method of claim 7, wherein when the type of unicast service is voice over Long Term Evolution (LTE) service, the method further comprises:
refraining from receiving the multicast/broadcast content during the measurement gap; and
leaving the serving cell and performing the measurement during the measurement gap.

9. The method of claim 7, wherein when the type of unicast service is packet data service and the type of multicast/broadcast service is file download service, the method further comprises:
refraining from receiving the file download service during the measurement gap; and
leaving the serving cell and performing the measurement during the measurement gap.

10. The method of claim 7, wherein when the type of unicast service is packet data service and the type of multicast/broadcast service is streaming service, the method further comprises:
refraining from leaving the serving cell and performing the measurement during the measurement gap; and
receiving the streaming service during the measurement gap.

11. A method of wireless communication, comprising:
receiving a configuration from a serving cell to perform a measurement during a measurement gap of a unicast service while in a connected mode; and
determining whether to refrain from leaving the serving cell on a first frequency and performing the measurement on a second frequency of a neighboring cell in order to receive multicast/broadcast content associated with a multicast/broadcast service during the measurement gap,
wherein the determination whether to refrain from leaving the serving cell and performing the measurement is based on a time period of an overlap of the measurement gap and a reception of at least one of control/system information or traffic data of the multicast/broadcast content, and
wherein when the overlap of the measurement gap and the reception of the control/system information and the traffic data extends over a portion of the measurement gap less than a time period, the method further comprises:
refraining from leaving the serving cell and performing the measurement during the portion of the measurement gap;
receiving the control/system information and the traffic data during the portion of the measurement gap; and
leaving the serving cell and performing the measurement during a remaining portion of the measurement gap.

12. A method of wireless communication, comprising:
receiving a configuration from a serving cell to perform a measurement during a measurement gap of a unicast service while in a connected mode; and
determining whether to refrain from leaving the serving cell on a first frequency and performing the measurement on a second frequency of a neighboring cell in order to receive multicast/broadcast content associated with a multicast/broadcast service during the measurement gap,
wherein the determination whether to refrain from leaving the serving cell and performing the measurement is based on a time period of an overlap of the measurement gap and a reception of at least one of control/system information or traffic data of the multicast/broadcast content, and
wherein when the overlap of the measurement gap and the reception of the control/system information extends over a first portion of the measurement gap, the overlap of the measurement gap and the reception of the traffic data extends over a second portion of the measurement gap, the first portion and the second portion are greater than a time period, and the first portion is less than the time period, the method further comprises:
refraining from leaving the serving cell and performing the measurement during the first portion of the measurement gap;
receiving the control/system information during the first portion of the measurement gap;
refraining from receiving the traffic data during the second portion of the measurement gap; and
leaving the serving cell and performing the measurement during the second portion and a remaining portion of the measurement gap.

13. A method of wireless communication, comprising:
receiving a configuration from a serving cell to perform a measurement during a measurement gap of a unicast service while in a connected mode;
determining whether to refrain from leaving the serving cell on a first frequency and performing the measurement on a second frequency of a neighboring cell in order to receive multicast/broadcast content associated with a multicast/broadcast service during the measurement gap, wherein the determination whether to refrain from leaving the serving cell and performing the measurement is based on a timer; and
starting the timer upon a previous measurement,
wherein when the reception of the multicast/broadcast content overlaps with the measurement gap and the timer has not expired, the method further comprises:
refraining from leaving the serving cell and performing the measurement during the measurement gap; and
receiving the multicast/broadcast content during the measurement gap,
wherein when the reception of the multicast/broadcast content overlaps with the measurement gap and the timer has expired, the method further comprises:
refraining from receiving the multicast/broadcast content during the measurement gap; and
leaving the serving cell and performing the measurement during the measurement gap.

14. An apparatus for wireless communication, comprising:
means for receiving a configuration from a serving cell to perform a measurement during a measurement gap of a unicast service while in a connected mode;
means for determining whether to refrain from leaving the serving cell on a first frequency and performing the measurement on a second frequency of a neighboring cell in order to receive multicast/broadcast content associated with a multicast/broadcast service during the measurement gap, wherein the determination whether to refrain from leaving the serving cell and performing the measurement is based on a signal quality of the serving cell, and an overlap of the measurement gap and a reception of at least one of control/system information or traffic data of the multicast/broadcast content;
means for receiving multicast/broadcast content and means for performing an inter-frequency/inter-RAT measurement, wherein when the reception of the control/system information overlaps with the measurement gap and the signal quality is greater than a first threshold and less than or equal to a second threshold, the means for performing an inter-frequency/inter-RAT measurement is configured to refrain from leaving the serving cell and performing the measurement during the measurement gap, and the means for receiving multicast/broadcast content is configured to receive the control/system information during the measurement gap.

15. The apparatus of claim 14,
wherein when the reception of said at least one of the control/system information or the traffic data overlaps with the measurement gap and the signal quality is greater than a threshold, the means for performing an inter-frequency/inter-RAT measurement is configured to refrain from leaving the serving cell and performing the measurement during the measurement gap, and the means for receiving multicast/broadcast content is configured to receive said at least one of the control/system information or the traffic data during the measurement gap.

16. The apparatus of claim 14, wherein when the reception of said at least one of the control/system information or the traffic data overlaps with the measurement gap and the signal quality is less than or equal to a threshold, the means for receiving multicast/broadcast content is configured to refrain from receiving said at least one of the control/system information or the traffic data during the measurement gap, and the means for performing an inter-frequency/inter-RAT measurement is configured to leave the serving cell and perform the measurement during the measurement gap.

17. The apparatus of claim 14, wherein when the reception of the multicast/broadcast content overlaps with the measurement gap, the means for performing an inter-frequency/inter-RAT measurement is configured to refrain from leaving the serving cell and performing the measurement during the measurement gap, and the means for receiving multicast/broadcast content is configured to receive the multicast/broadcast content during the measurement gap.

18. The apparatus of claim 14, wherein the determination whether to refrain from leaving the serving cell and performing the measurement is based on a timer.

19. An apparatus for wireless communication, comprising:
means for receiving a configuration from a serving cell to perform a measurement during a measurement gap of a unicast service while in a connected mode;
means for determining whether to refrain from leaving the serving cell on a first frequency and performing the measurement on a second frequency of a neighboring cell in order to receive multicast/broadcast content associated with a multicast/broadcast service during the measurement gap, wherein the determination whether to refrain from leaving the serving cell and performing the measurement is based on a signal quality of the serving cell, and an overlap of the measurement gap and a reception of at least one of control/system information or traffic data of the multicast/broadcast content;
means for receiving multicast/broadcast content and means for performing an inter-frequency/inter-RAT measurement, wherein when the reception of the traffic data overlaps with the measurement gap and the signal quality is greater than a first threshold and less than or equal to a second threshold, the means for receiving multicast/broadcast content is configured to refrain from receiving the traffic data during the measurement gap, and the means for performing an inter-frequency/inter-RAT measurement is configured to leave the serving cell and perform the measurement during the measurement gap.

20. An apparatus for wireless communication, comprising:
means for receiving a configuration from a serving cell to perform a measurement during a measurement gap of a unicast service while in a connected mode; and
means for determining whether to refrain from leaving the serving cell on a first frequency and performing the measurement on a second frequency of a neighboring cell in order to receive multicast/broadcast content associated with a multicast/broadcast service during the measurement gap,
wherein the determination whether to refrain from leaving the serving cell and performing the measurement is based on at least one of a type of the unicast service or a type of the multicast/broadcast service.

21. The apparatus of claim 20, further comprising means for receiving multicast/broadcast content and means for performing an inter-frequency/inter-RAT measurement, wherein when the type of unicast service is voice over Long Term Evolution (LTE) service, the means for receiving multicast/broadcast content is configured to refrain from receiving the multicast/broadcast content during the measurement gap, and the means for performing an inter-frequency/inter-RAT measurement is configured to leave the serving cell and perform the measurement during the measurement gap.

22. The apparatus of claim 20, further comprising means for receiving multicast/broadcast content and means for performing an inter-frequency/inter-RAT measurement, wherein when the type of unicast service is packet data service and the type of multicast/broadcast service is file download service, the means for receiving multicast/broadcast content is configured to refrain from receiving the file download service during the measurement gap, and the means for performing an inter-frequency/inter-RAT measurement is configured to leave the serving cell and perform the measurement during the measurement gap.

23. The apparatus of claim 20, further comprising means for receiving multicast/broadcast content and means for performing an inter-frequency/inter-RAT measurement, wherein when the type of unicast service is packet data service and the type of multicast/broadcast service is streaming service, the means for performing the inter-frequency/inter-RAT measurement is configured to refrain from leaving the serving cell and performing the measurement during the measurement gap, and the means for receiving multicast/broadcast content is configured to receive the streaming service during the measurement gap.

24. An apparatus for wireless communication, comprising:
means for receiving a configuration from a serving cell to perform a measurement during a measurement gap of a unicast service while in a connected mode;
means for determining whether to refrain from leaving the serving cell on a first frequency and performing the measurement on a second frequency of a neighboring cell in order to receive multicast/broadcast content associated with a multicast/broadcast service during the measurement gap, wherein the determination whether to refrain from leaving the serving cell and performing the measurement is based on a time period of an overlap of the measurement gap and a reception of at least one of control/system information or traffic data of the multicast/broadcast content;
means for receiving multicast/broadcast content and means for performing an inter-frequency/inter-RAT measurement, wherein when the overlap of the measurement gap and the reception of the control/system information and the traffic data extends over a portion of the measurement gap less than a time period, the means for performing an inter-frequency/inter-RAT measurement is configured to refrain from leaving the serving cell and performing the measurement during the portion of the measurement gap, the means for receiving multicast/broadcast content is configured to receive the control/system information and the traffic data during the portion of the measurement gap, and the means for performing an inter-frequency/inter-RAT measurement is configured to leave the serving cell and perform the measurement during a remaining portion of the measurement gap.

25. An apparatus for wireless communication, comprising:
means for receiving a configuration from a serving cell to perform a measurement during a measurement gap of a unicast service while in a connected mode;
means for determining whether to refrain from leaving the serving cell on a first frequency and performing the measurement on a second frequency of a neighboring cell in order to receive multicast/broadcast content associated with a multicast/broadcast service during the measurement gap, wherein the determination whether to refrain from leaving the serving cell and performing the measurement is based on a time period of an overlap of the measurement gap and a reception of at least one of control/system information or traffic data of the multicast/broadcast content;
means for receiving multicast/broadcast content and means for performing an inter-frequency/inter-RAT measurement, wherein when the overlap of the measurement gap and the reception of the control/system information extends over a first portion of the measurement gap, the overlap of the measurement gap and the reception of the traffic data extends over a second portion of the measurement gap, the first portion and the second portion are greater than a time period, and the first portion is less than the time period, the means for performing an inter-frequency/inter-RAT measurement is configured to refrain from leaving the serving cell and performing the measurement during the first portion of the measurement gap, the means for receiving multicast/broadcast content is configured to receive the control/system information during the first portion of the measurement gap, the means for receiving multicast/broadcast content is configured to refrain from receiving the traffic data during the second portion of the measurement gap, and the means for performing an inter-frequency/inter-RAT measurement is configured to leave the serving cell and perform the measurement during the second portion and a remaining portion of the measurement gap.

26. An apparatus for wireless communication, comprising:
means for receiving a configuration from a serving cell to perform a measurement during a measurement gap of a unicast service while in a connected mode;
means for determining whether to refrain from leaving the serving cell on a first frequency and performing the measurement on a second frequency of a neighboring cell in order to receive multicast/broadcast content associated with a multicast/broadcast service during the measurement gap, wherein the determination whether to refrain from leaving the serving cell and performing the measurement is based on a timer;
means for receiving multicast/broadcast content, means for performing an inter-frequency/inter-RAT measurement, and means for starting the timer upon a previous measurement,
wherein when the reception of the multicast/broadcast content overlaps with the measurement gap and the timer has not expired, the means for performing an inter-frequency/inter-RAT measurement is configured to refrain from leaving the serving cell and performing the measurement during the measurement gap, and the means for receiving multicast/broadcast content is configured to receive the multicast/broadcast content during the measurement gap,
wherein when the reception of the multicast/broadcast content overlaps with the measurement gap and the timer has expired, the means for receiving multicast/broadcast content is configured to refrain from receiving the multicast/broadcast content during the measurement gap, and the means for performing an inter-frequency/inter-RAT measurement is configured to leave the serving cell and perform the measurement during the measurement gap.

27. An apparatus for wireless communication, comprising:
a memory; and
at least one processor coupled to the memory and configured to:
receive a configuration from a serving cell to perform a measurement during a measurement gap of a unicast service while in a connected mode; and
determine whether to refrain from leaving the serving cell on a first frequency and performing the measurement on a second frequency of a neighboring cell in order to receive multicast/broadcast content associated with a multicast/broadcast service during the measurement gap, wherein the determination whether to refrain from leaving the serving cell and performing the measurement is based on a signal quality of the serving cell, and an overlap of the measurement gap and a reception of at least one of control/system information or traffic data of the multicast/broadcast content, and
wherein when the reception of the control/system information overlaps with the measurement gap and the signal quality is greater than a first threshold and less than or equal to a second threshold, the at least one processor is further configured to:
refrain from leaving the serving cell and performing the measurement during the measurement gap; and
receive the control/system information during the measurement gap.

28. The apparatus of claim 27, wherein when the reception of said at least one of the control/system information or the traffic data overlaps with the measurement gap and the signal quality is greater than a threshold, the at least one processor is further configured to:
- refrain from leaving the serving cell and performing the measurement during the measurement gap; and
- receive said at least one of the control/system information or the traffic data during the measurement gap.

29. The apparatus of claim 27, wherein when the reception of said at least one of the control/system information or the traffic data overlaps with the measurement gap and the signal quality is less than or equal to a threshold, the at least one processor is further configured to:
- refrain from receiving said at least one of the control/system information or the traffic data during the measurement gap; and
- leave the serving cell and perform the measurement during the measurement gap.

30. The apparatus of claim 27, wherein when the reception of the multicast/broadcast content overlaps with the measurement gap, the at least one processor is further configured to:
- refrain from leaving the serving cell and performing the measurement during the measurement gap; and
- receive the multicast/broadcast content during the measurement gap.

31. The apparatus of claim 27, wherein the determination whether to refrain from leaving the serving cell and performing the measurement is based on a timer.

32. An apparatus for wireless communication, comprising:
a memory; and
at least one processor coupled to the memory and configured to:
- receive a configuration from a serving cell to perform a measurement during a measurement gap of a unicast service while in a connected mode; and
- determine whether to refrain from leaving the serving cell on a first frequency and performing the measurement on a second frequency of a neighboring cell in order to receive multicast/broadcast content associated with a multicast/broadcast service during the measurement gap, wherein the determination whether to refrain from leaving the serving cell and performing the measurement is based on a signal quality of the serving cell, and an overlap of the measurement gap and a reception of at least one of control/system information or traffic data of the multicast/broadcast content, and
- wherein when the reception of the traffic data overlaps with the measurement gap and the signal quality is greater than a first threshold and less than or equal to a second threshold, the at least one processor is further configured to:
  - refrain from receiving the traffic data during the measurement gap; and
  - leave the serving cell and perform the measurement during the measurement gap.

33. An apparatus for wireless communication, comprising:
a memory; and
at least one processor coupled to the memory and configured to:
- receive a configuration from a serving cell to perform a measurement during a measurement gap of a unicast service while in a connected mode; and
- determine whether to refrain from leaving the serving cell on a first frequency and performing the measurement on a second frequency of a neighboring cell in order to receive multicast/broadcast content associated with a multicast/broadcast service during the measurement gap,
- wherein the determination whether to refrain from leaving the serving cell and performing the measurement is based on at least one of a type of the unicast service or a type of the multicast/broadcast service.

34. The apparatus of claim 33, wherein when the type of unicast service is voice over Long Term Evolution (LTE) service, the at least one processor is further configured to:
- refrain from receiving the multicast/broadcast content during the measurement gap; and
- leave the serving cell and perform the measurement during the measurement gap.

35. The apparatus of claim 33, wherein when the type of unicast service is packet data service and the type of multicast/broadcast service is file download service, the at least one processor is further configured to:
- refrain from receiving the file download service during the measurement gap; and
- leave the serving cell and perform the measurement during the measurement gap.

36. The apparatus of claim 33, wherein when the type of unicast service is packet data service and the type of multicast/broadcast service is streaming service, the at least one processor is further configured to:
- refrain from leaving the serving cell and performing the measurement during the measurement gap; and
- receive the streaming service during the measurement gap.

37. An apparatus for wireless communication, comprising:
a memory; and
at least one processor coupled to the memory and configured to:
- receive a configuration from a serving cell to perform a measurement during a measurement gap of a unicast service while in a connected mode; and
- determine whether to refrain from leaving the serving cell on a first frequency and performing the measurement on a second frequency of a neighboring cell in order to receive multicast/broadcast content associated with a multicast/broadcast service during the measurement gap,
- wherein the determination whether to refrain from leaving the serving cell and performing the measurement is based on a time period of an overlap of the measurement gap and a reception of at least one of control/system information or traffic data of the multicast/broadcast content, and
- wherein when the overlap of the measurement gap and the reception of the control/system information and the traffic data extends over a portion of the measurement gap less than a time period, the at least one processor is further configured to:
  - refrain from leaving the serving cell and performing the measurement during the portion of the measurement gap;
  - receive the control/system information and the traffic data during the portion of the measurement gap; and
  - leave the serving cell and perform the measurement during a remaining portion of the measurement gap.

38. An apparatus for wireless communication, comprising:
a memory; and
at least one processor coupled to the memory and configured to:
- receive a configuration from a serving cell to perform a measurement during a measurement gap of a unicast service while in a connected mode; and
- determine whether to refrain from leaving the serving cell on a first frequency and performing the measurement on a second frequency of a neighboring cell in order to receive multicast/broadcast content associated with a multicast/broadcast service during the measurement gap, wherein the determination whether to refrain from leaving the serving cell and performing the measurement is based on a time period of an overlap of the measurement gap and a reception of at least one of control/system information or traffic data of the multicast/broadcast content, and wherein when the overlap of the measurement gap and the reception of the control/system information extends over a first portion of the measurement gap, the overlap of the measurement gap and the reception of the traffic data extends over a second portion of the measurement gap, the first portion and the second portion are greater than a time period, and the first portion is less than the time period, the at least one processor is further configured to:

refrain from leaving the serving cell and performing the measurement during the first portion of the measurement gap;

receive the control/system information during the first portion of the measurement gap;

refrain from receiving the traffic data during the second portion of the measurement gap; and leave the serving cell and perform the measurement during the second portion and a remaining portion of the measurement gap.

39. An apparatus for wireless communication, comprising:
a memory; and
at least one processor coupled to the memory and configured to:
receive a configuration from a serving cell to perform a measurement during a measurement gap of a unicast service while in a connected mode;
determine whether to refrain from leaving the serving cell on a first frequency and performing the measurement on a second frequency of a neighboring cell in order to receive multicast/broadcast content associated with a multicast/broadcast service during the measurement gap, wherein the determination whether to refrain from leaving the serving cell and performing the measurement is based on a timer; and
starting the timer upon a previous measurement, wherein when the reception of the multicast/broadcast content overlaps with the measurement gap and the timer has not expired, the at least one processor is further configured to:

refrain from leaving the serving cell and performing the measurement during the measurement gap; and receive the multicast/broadcast content during the measurement gap, wherein when the reception of the multicast/broadcast content overlaps with the measurement gap and the timer has expired, the at least one processor is further configured to:

refrain from receiving the multicast/broadcast content during the measurement gap; and leave the serving cell and perform the measurement during the measurement gap.

40. A computer program product, comprising:
a non-transitory computer-readable medium comprising code for:
receiving a configuration from a serving cell to perform a measurement during a measurement gap of a unicast service while in a connected mode; and
determining whether to refrain from leaving the serving cell on a first frequency and performing the measurement on a second frequency of a neighboring cell in order to receive multicast/broadcast content associated with a multicast/broadcast service during the measurement gap,
wherein the determination whether to refrain from leaving the serving cell and performing the measurement is based on a signal quality of the serving cell, and an overlap of the measurement gap and a reception of at least one of control/system information or traffic data of the multicast/broadcast content, and
wherein when the reception of the control/system information overlaps with the measurement gap and the signal quality is greater than a first threshold and less than or equal to a second threshold, the non-transitory computer-readable medium further comprises code for:
refraining from leaving the serving cell and performing the measurement during the measurement gap; and
receiving the control/system information during the measurement gap.

* * * * *